United States Patent
Wegeng et al.

(10) Patent No.: US 6,974,496 B2
(45) Date of Patent: Dec. 13, 2005

(54) APPARATUS FOR THERMAL SWING ADSORPTION AND THERMALLY-ENHANCED PRESSURE SWING ADSORPTION

(75) Inventors: Robert S. Wegeng, Richland, WA (US); Scot D. Rassat, Benton City, WA (US); Victoria S. Stenkamp, Richland, WA (US); Ward E. TeGrotenhuis, Kennewick, WA (US); Dean W. Matson, Kennewick, WA (US); M. Kevin Drost, Corvallis, OR (US); Vilayanur V. Viswanathan, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 77 days.

(21) Appl. No.: 10/609,501

(22) Filed: Jun. 30, 2003

(65) Prior Publication Data

US 2004/0069144 A1 Apr. 15, 2004

Related U.S. Application Data

(62) Division of application No. 09/845,776, filed on Apr. 30, 2001, now Pat. No. 6,630,012.

(51) Int. Cl.[7] .............................................. B01D 53/04
(52) U.S. Cl. .............................. 96/126; 96/130; 96/146
(58) Field of Search ........................ 96/108, 121, 126, 96/130, 146, 154; 95/90, 96, 99, 106, 114, 115, 139, 140

(56) References Cited

U.S. PATENT DOCUMENTS 3,568,406 A * 3/1971 Dynes ........................ 95/115
4,055,962 A    11/1977 Terry .......................... 62/102
4,056,369 A * 11/1977 Quackenbush ........... 208/262.1

(Continued)

FOREIGN PATENT DOCUMENTS

| DE | 3509564 A1 | 9/1986 |
|---|---|---|
| EP | 0 976 679 | 2/2000 |
| JP | 61107668 0 | 5/1986 |
| JP | 02170369 0 | 7/1990 |
| JP | 2000351604 | 12/2000 |
| JP | 2001035518 | 2/2001 |
| JP | 2001085040 | 3/2001 |
| WO | WO 00/45940 | 8/2000 |
| WO | WO 01/012323 A2 | 2/2001 |

OTHER PUBLICATIONS

PCT Search Report, mailed Jan. 8, 2003, PCT/US 02/13722.
H Barthels et al., "*Phoebus–Julich: An Autonomous Energy Supply System Comprising Photovoltaics, Electrolytic Hydrogen, Fuel Cell*", p. 295–301. 1997.

(Continued)

*Primary Examiner*—Frank M. Lawrence
(74) *Attorney, Agent, or Firm*—Frank Rosenberg; Todd J. Harrington

(57) ABSTRACT

The present invention provides compact adsorption systems that are capable of rapid temperature swings and rapid cycling. Novel methods of thermal swing adsorption and thermally-enhanced pressure swing adsorption are also described. In some aspects of the invention, a gas is passed through the adsorbent thus allowing heat exchangers to be very close to all portions of the adsorbent and utilize less space. In another aspect, the adsorption media is selectively heated, thus reducing energy costs. Methods and systems for gas adsorption/desorption having improved energy efficiency with capability of short cycle times are also described. Advantages of the invention include the ability to use (typically) 30–100 times less adsorbent compared to conventional systems.

27 Claims, 11 Drawing Sheets

Adsorption

U.S. PATENT DOCUMENTS

| | | | |
|---|---|---|---|
| 4,281,969 A | | 8/1981 | Doub, Jr. .................... 417/52 |
| 4,444,727 A | * | 4/1984 | Yanagihara et al. ......... 422/223 |
| 4,612,022 A | * | 9/1986 | Berry ........................ 95/113 |
| 4,779,428 A | | 10/1988 | Chan et al. .................. 62/467 |
| 4,793,143 A | * | 12/1988 | Rhodes ........................ 62/93 |
| 5,046,319 A | | 9/1991 | Jones ....................... 62/46.2 |
| 5,298,054 A | * | 3/1994 | Malik .......................... 95/104 |
| 5,419,156 A | | 5/1995 | Sywulka ..................... 62/476 |
| 5,611,214 A | | 3/1997 | Wegeng et al. ............. 62/498 |
| 5,650,221 A | * | 7/1997 | Belding et al. .......... 162/157.2 |
| 5,674,301 A | | 10/1997 | Sakai et al. .................... 48/61 |
| 5,681,370 A | * | 10/1997 | McMahon ................. 95/105 |
| 5,802,870 A | * | 9/1998 | Arnold et al. .............. 62/480 |
| 5,811,062 A | | 9/1998 | Wegeng et al. ............ 422/129 |
| 5,948,142 A | | 9/1999 | Holmes et al. ............... 95/99 |
| 6,066,192 A | * | 5/2000 | Toshinaga et al. ........... 95/101 |
| 6,126,723 A | | 10/2000 | Drost et al. .................... 95/4 |
| 6,143,943 A | | 11/2000 | Oroskar et al. ............ 585/654 |
| 6,251,164 B1 | * | 6/2001 | Notaro et al. ................ 95/106 |
| 6,293,998 B1 | * | 9/2001 | Dolan et al. ................. 95/106 |
| 6,488,838 B1 | | 12/2002 | Tonkovich et al. ........ 208/108 |
| 6,508,862 B1 | | 1/2003 | Tonkovich et al. ........... 95/106 |
| 6,630,012 B2 | | 10/2003 | Wegeng et al. .............. 95/106 |
| 6,652,627 B1 | * | 11/2003 | Tonkovich et al. ........... 95/104 |
| 6,708,546 B2 | * | 3/2004 | Myasnikov et al. .......... 72/121 |
| 6,746,515 B2 | | 6/2004 | Wegeng et al. ................ 95/96 |
| 6,814,781 B2 | | 11/2004 | Tonkovich et al. ............ 95/90 |

OTHER PUBLICATIONS

X Feng et al., "Hollow–Fiber–Based Adsorbers for Gas Separation by Pressure–Swing Adsorption". p. 1555–1562. 1998.

JA Jones et al., "Design, Life Testing, and Future Designs of Cryogenic Hydride Refrigeration Systems", p. 1–23, no date.

K Karperos, "Operating Characteristics of a Hydrogen Sorption Refrigerator Part I: Experiment Design and Results". p. 1–15.

JJ Reilly et al., "A New Laboratory Gas Circulation Pump for Intermediate Pressures" p. 1485–1486. 1971.

WJ Thomas et al., "Adsorption Technology and Design", p. 108–119, 220–227. 1998.

VV Vishwanathan et al., "Microscale Adsorption for Energy and Chemical Systems", p. 1–3. 2001.

* cited by examiner

Adsorption

Desorption

APPARATUS FOR THERMAL SWING ADSORPTION AND THERMALLY-ENHANCED PRESSURE SWING ADSORPTION

RELATED APPLICATIONS

This application is a divisional of Ser. No. 09/845,776, filed Apr. 30, 2001, now U.S. Pat. No. 6,630,012, which is incorporated herein by reference.

This invention was made with Government support under contract DE-AC0676RLO 1830 awarded by the U.S. Department of Energy. The Government has certain rights in this invention.

FIELD OF THE INVENTION

This invention relates to apparatus and methods of gas adsorption.

BACKGROUND OF THE INVENTION

Separations of gases have long been important in gas purification processes such as used industrially in gas purification. Removal of carbon dioxide continues to be an important objective for purifying air for humans to live underwater and in space. Other important technologies that can utilize improvements for gas separation include: fuel cells, ammonia production, fertilizer manufacture, oil refining, synthetic fuels production, natural gas sweetening, oil recovery and steel welding.

The adsorption capacity of a gaseous species onto an adsorbent is commonly expressed in graphical form in adsorption isotherms and isobars, which are widely published in the literature and by adsorbent manufacturers and suppliers. For the sorption of gas species, the capacity is typically expressed as the equilibrium mass of the species sorbed per unit mass of adsorbent (e.g., kg species/100-kg adsorbent). The sorbent capacity varies as a function of temperature and the partial pressure (concentration) of the species being sorbed. Loading or capacity typically increases as the adsorbent bed temperature decreases or the partial pressure of the sorbed species in the gas phase increases.

The variation of adsorption capacity with temperature and pressure can be used to effect separations of gas species. For example, in pressure swing adsorption (PSA) gas species are adsorbed onto a sorbent at relatively high pressure, tending to remove the species from the feed stream. In a regenerative PSA process, reducing the absolute pressure (e.g., applying a vacuum) to the loaded sorbent bed or reducing the partial pressure of the sorbed species in the gas phase by sweeping a lower concentration purge gas through the bed regenerates the sorbent. Cycle times for PSA processes are typically measured in minutes (Humphrey and Keller, "Separation Process Technology, McGraw-Hill, 1997). In a regenerative temperature swing or thermal swing (TSA) adsorption process, species are adsorbed at low temperature where the loading capacity is relatively high and (at least partially) desorbed at higher temperature, thus recovering sorption capacity for additional cycles.

In addition to gas species separations, TSA can be used to thermochemically compress gases. Sorption based thermochemical compression is applicable to refrigeration and heat pump cycles (e.g., see Sywulka, U.S. Pat. No. 5,419,156) and for chemical processing in general.

Gas adsorption is known to be applicable to a wide range of gas species (see, e.g., Kohl and Nielsen, Gas Purification, 5th Ed., Gulf Publ. Co., Houston, Tex.). Kohl and Nielsen report that in conventional TSA gas purification processes, adsorbent bed loading and unloading cycles are typically on the order of hours.

Despite their long-known use and importance, multiple problems remain with gas adsorption separation technologies. These problems include: use of excess energy, bulky apparatus or low capacity, cost, and slow rate and/or low mass of gas separated.

SUMMARY OF THE INVENTION

In one aspect, the present invention provides a sorption pump that includes an adsorption layer comprising an adsorption mesochannel containing adsorption media, and a heat exchanger in thermal contact with the adsorption layer. The heat exchanger includes at least one microchannel. The adsorption layer has a gas inlet such that gas directly contacts the adsorption media without first passing through a contactor material.

In another aspect, the invention provides gas adsorption and desorption apparatus that includes at least one adsorption layer comprising an adsorption mesochannel containing adsorption media. The adsorption mesochannel has dimensions of length, width and height; wherein the height is at least 1.2 mm. The apparatus possesses capability such that, if the adsorption media is replaced with an equal volume of 13x zeolite, having a bulk density of about 0.67 grams per cubic centimeter, and then saturated with carbon dioxide at 760 mm Hg and 5° C. and then heated to no more than 90° C., at 760 mm Hg, then at least 0.015 g $CO_2$ per mL of apparatus is desorbed within 1 minute of the onset of heating. By heated to "no more than 90° C." typically means that 90° C. water is passed through the heat exchanger; however, the phrase also encompasses heating by other means such as an electrically-resistive heater. Preferably, the apparatus includes at least one heat exchanger in thermal contact with the adsorption layer.

In yet another aspect, the apparatus is configured to selectively heat the adsorbent. The at least one heat exchanger could be configured such that the heat exchange fluid flow paths substantially overlap the area of adsorption channel or channels. Alternatively, the apparatus could contain a relatively thermally conductive material overlapping the adsorption channel or adsorption channels and a relatively thermally insulating material that does not substantially overlap the adsorbent channel or adsorbent material. By "substantially overlap" it is meant that, when viewed from a direction perpendicular to the direction of flow in which the adsorption channel and heat exchanger is stacked, the areas of the adsorbent channel(s) and the thermally conductive material have at least about an 80% overlap.

In a further aspect, the invention provides a sorption pump, that includes an adsorption layer comprising an adsorption channel containing adsorption media, and a mesochannel heat exchanger in thermal contact with the adsorption layer. The mesochannel heat exchanger has a fluid flowing therethrough that has a high thermal diffusivity, such that the characteristic heat transport time for the fluid in combination with the mesochannel heat exchanger is no greater than 10 seconds.

The invention also provides an apparatus in which adsorption/desorption cells are connected to improve overall energy efficiency. Each cell contains at least one adsorption mesochannel having an inlet and/or outlet. Typically, each cell contains multiple adsorption mesochannels that share a common header and common footer, and that are operated together. Preferably, each adsorption channel is in thermal contact with at least one heat exchanger. Each adsorption channel contains adsorption media. Typically, the apparatus also contains or is used in conjunction with a heat source and a heat sink. In some embodiments, the heat sink could be the non-adsorbed gas, which is passed through and removed from the apparatus. The apparatus contains heat transfer conduits between each cell and the heat source and heat sink and also contains heat transfer conduits between each cell and at least two other cells. In operation, the conduits carry a heat exchange fluid or can contain a thermally conductive material. The apparatus also contains valves that can control gas flow into the at least one adsorption channel. Cell volume is defined as the volume of the adsorption channel or channels that are operated together, including the volume of the heat exchange channel or channels, the volume between such channels, the volume of the outer walls of the cells, and the volume of inlet and outlet footers, when present.

The invention further provides a method of gas adsorption and desorption, comprising passing a gas into an adsorption layer where at least a portion of the gas is adsorbed onto adsorption media to form an adsorbed gas and selectively removing heat from the adsorption layer through a distance of 1 cm, preferably 2 mm, or less into a heat exchanger; and, subsequently, selectively heating the adsorption media through a distance of 1 cm, preferably 2 mm, or less from a heat exchanger, and desorbing gas. The gas directly contacts the adsorption media without first passing through a contactor material. For more rapid heat transfer (and thus faster cycling), the adsorption channel may contain heat transfer agents such as metal fins or pins, or graphite fibers.

The invention also provides a method of gas adsorption and desorption, comprising passing a gas into an adsorption layer where at least a portion of the gas is adsorbed onto adsorption media to form an adsorbed gas and selectively removing heat from the adsorption layer through a distance of 1 cm or less into a heat exchanger; and, subsequently, selectively heating the adsorption media through a distance of 1 cm or less from a heat exchanger, and desorbing gas.

The invention also provides a multi-cell sorption pump, comprising: at least six sorption cells; where each sorption cell comprises at least one adsorption layer, and at least one heat exchanger layer. Thermal connections connect each sorption cell to at least two other sorption cells and to a heat source and to a heat sink, such that each sorption cell can cycle thermally from adsorption to desorption and back to adsorption by sequentially receiving heat from said at least two other sorption cells prior to receiving heat from the heat source, and then sequentially giving up heat to at least two other sorption cells prior to giving up heat to the heat sink, such that thermal recuperation is provided.

The invention also provides a method of gas adsorption and desorption, comprising a first step of passing a gas into a first adsorption layer containing a first adsorption media where at least a portion of the gas is adsorbed onto the adsorption media to form an adsorbed gas and removing heat from the adsorption layer through a distance of 1 cm or less into a first heat exchanger. Subsequently, in a second step, the adsorption media is heated through a distance of 1 cm or less from the first heat exchanger, and gas is desorbed. Simultaneous with the first step, a heat exchange fluid flows through the heat exchanger and exchanges heat with the adsorbent. This heat exchange fluid flows into a second heat exchanger that, in turn, exchanges heat with a second adsorption layer containing a second adsorption media.

The invention also provides a method of gas adsorption and desorption that includes: a first step of transferring heat from a heat source into at least two first cells and desorbing gas from each of the two first cells, and transferring heat from at least two second cells to at least two third cells; a second step of transferring heat from the at least two second cells to a heat sink, and adsorbing gas into the at least two second cells, transferring heat from the at least two first cells to the at least two third cells; a third step of transferring heat from a heat source into the at least two third cells, and desorbing gas from each of the at least two third cells, transferring heat from the at least two first cells to the at least two second cells; and a fourth step of transferring heat from the at least two first cells to a heat sink, and adsorbing gas into the at least two first cells, transferring heat from the at least two third cells to the at least two second cells. In this method, each cell comprises at least one sorbent, and at least one heat exchanger.

The invention also provides a method of adsorption and desorption that provides the thermal enhancement of PSA adsorption, thereby obtaining greater utilization of the adsorbent media than would be accomplished by PSA adsorption alone. This includes cooling of the adsorbent media during adsorption at one partial pressure of the adsorbing specie(s), so that a greater amount of adsorbing specie(s) can be adsorbed, and/or heating of the adsorbent media during desorption at a lower partial pressure of the desorbing specie(s), so that a greater amount of desorbing specie(s) can be desorbed. In general, the methods described herein are applicable for thermal swing adsorption, thermally-enhanced pressure swing adsorption, and thermochemical compression.

In a report ("Microscale Adsorption for Energy and Chemical Systems") appearing on the PNNL web site in May 2000, Viswanathan, Wegeng and Drost reported the results of calculations and experiments for investigations of microchannel adsorption with short cycle times. From the reported estimate that 95% of $CO_2$ reaches the zeolite particles in 30 seconds, based on semi-infinite diffusion, it is clear that this calculation involves zeolite adsorbent in a "flow-by" arrangement, rather than a "flow-through" arrangement. A "flow-by" arrangement is one in which adsorbent occupies less than the full cross-sectional area of the flow path and gas flow is primarily by an adsorbent, requiring that contact of the adsorbent media, with the specie(s) to be adsorbed, occur primarily by mass diffusion into and through the adsorbent structure, while in a "flow-through" arrangement the adsorbent is substantially placed within the flow path, so that the fluid flows directly "through" rather than adjacent to the adsorbent structure.

Various embodiments of the invention can provide numerous advantages including one or more of the following: rapid cycling, rapid sorbent regeneration, reduced time and/or larger volumes of gas adsorbed as a function of sorbent mass required, excellent device stability, low cost, direct sorption into the sorption media without requiring diffusion through a contactor, preferential heating/cooling of the sorption media to a greater degree than other elements of the adsorber structure, configurations of sorption units with recuperative heat exchange thereby allowing energetically efficient temperature swing separations and/or more energetically-efficient, thermochemical compression.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

GLOSSARY

In the present invention, the term "microchannel" refers to a channel with at least one dimension, of 1 mm or less, preferably in a direction perpendicular to net flow through the channel. The term "mesochannel" refers to a channel with at least one dimension, in a direction perpendicular to net flow through the channel, of 1 cm or less.

The "theoretical capacity" of an amount of adsorbent is determined by maintaining the adsorbent at a first temperature, at a fixed partial pressure for the gas specie(s) to be adsorbed, for a sufficient period of time so that essentially no more gas will be adsorbed, then shutting off the gas flow and heating to a second temperature to desorb gas, at the same or another fixed partial pressure for the gas specie(s), until essentially no more gas is desorbed, and measuring the amount of gas desorbed; the amount of gas desorbed is defined to be the "theoretical capacity" of an adsorbent material for that set of process conditions. The actual "capacity utilized" within a working sorption pump is measured at the same pressure and temperature conditions, but for a selected, finite period of time, and therefore may be less than the theoretical capacity.

BRIEF DESCRIPTION OF THE DRAWINGS

FIG. 5 schematically illustrates a system and process for regenerating air for an astronaut or the like.

THEORY AND DESIGN OF MESOCHANNEL SORPTION PUMPS

Figure 1A:
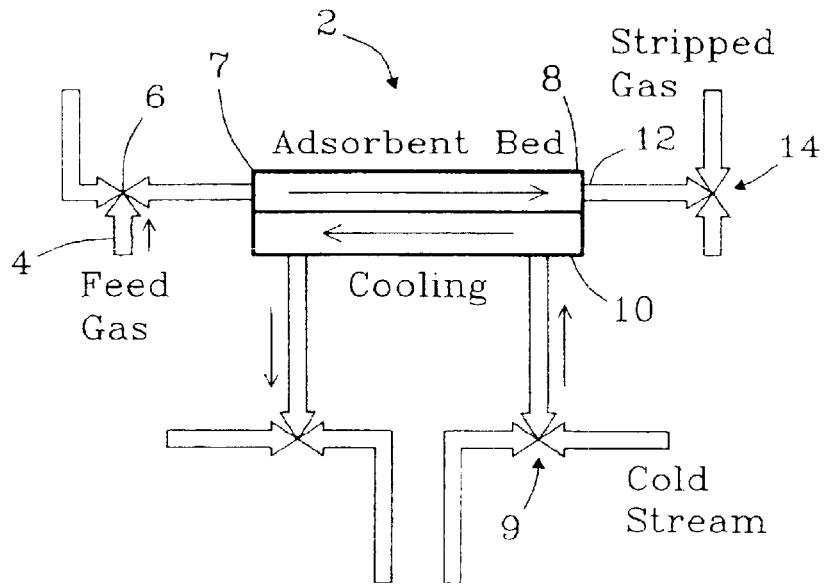
FIG. 1a schematically illustrates a simplified adsorption process.

A sorption pump is defined as a device which captures a gas, or constituents within a gas, onto the surface of an adsorbent media, and then desorbs at least a portion of the captured gas, as the system is brought to a different temperature and/or pressure. A sorption pump makes use of the change in equilibrium sorption capacity of a sorbent that occurs when temperature and/or pressure conditions are changed.

A mesochannel sorption pump contains adsorbent material within a mesochannel, which is in thermal contact with a heat exchanger, preferably a mesochannel heat exchanger, thereby providing rapid heat transfer between the adsorbent mesochannel and the heat exchanger mesochannel.

For example, $CO_2$ can be adsorbed onto the interior and exterior surfaces of zeolite, then heated to desorb $CO_2$ at a higher temperature (temperature swing adsorption—TSA). Alternately, $CO_2$ could be released from the zeolite at a lower pressure (pressure swing adsorption) than the pressure (or partial pressure) at which it had been adsorbed.

In order to obtain a sorption pump design that has a high productivity per hardware volume, it is necessary to cycle an adsorbing media rapidly. This is encouraged by fast heat and mass transport, of the type that can be provided by microchannels and mesochannels.

Heat and mass transport within fluids in microchannels and mesochannels are usually dominated by diffusion; that is, since fluid flow in microchannels is almost always in the laminar flow regime (i.e., not turbulent flow), heat and mass transport are primarily obtained through diffusion within the fluids.

A mesochannel is a channel that has a height that is less than 1 cm, a width, and a length, with the width and length not being limited by any degree other than whatever is practical. A microchannel is a mesochannel that has a height that is less than 1 mm. For both, the optimum design typically includes orienting the height of the channel in the direction for which rapid heat and/or mass transport is desired.

Rapid cycling of a mesochannel sorption pump requires attention to the transient thermal response within the heat exchange channels, the adsorption channels, and the walls that separates these two sets of channels, especially if highly effective thermal recuperation is desired, as will be discussed later. Preferably, the mesochannel sorption pump is designed so that the heat transport distance across the walls is sufficiently small so that it does not significantly influence the cycling time or performance of the system.

The characteristic heat transport time ($t_{ht}$) in a heat exchanger channel is related to the time that it takes for a substantial degree of thermal diffusion to occur. More precisely, for laminar flow within a mesochannel, where heat transport is dominated by diffusion, the characteristic heat transport time is defined to be a function of the heat transport distance and the thermal diffusivity of the heat exchange fluid, as follows:

$$t_{ht} = h^2/\alpha$$

where h is the height of the channel and $\alpha$ is the thermal diffusivity of the fluid. For example, water (at 300 K, 1 bar, with a thermal diffusivity $\alpha=1.46\times10^{-8}$ $m^2/sec$) flowing in a 250 micron high channel will have a characteristic heat transport time of:

$$t_{ht} = h^2/\alpha = [(250 \text{ microns})(10^{-6} \text{ m/micron})]^2/(1.46\times10^{-8} \text{ m}^2/\text{sec}) = 4.28 \text{ seconds}$$

Defining the characteristic heat transport time in this manner is mathematically equivalent to setting the dimensionless Fourier Number ($F_o$) equal to unity. For processes where $F_o$ is equal to one, a substantial amount of diffusion has occurred; however, the transient thermal response of the fluid is not yet complete. Since net diffusion slows as thermal equilibrium is approached, additional time steps, of $t_{ht}$ may be needed to achieve the desired approximation of thermal equilibrium within the heat exchanger channel.

By comparison, air (at 300 K, 1 bar, with a thermal diffusivity of $\alpha=2.20\times10^{-5}$ m$^2$/sec) and liquid sodium (at 473 K, 1 bar, with a thermal diffusivity of $\alpha=4.78\times10^{-5}$ m$^2$/sec) have characteristic heat transport times, in 250 micron high channels, of 2.84 milliseconds and 1.31 milliseconds, respectively.

It is also useful to note that the characteristic heat transport time scales with the square of the channel height. With channels that are ten times taller, that is, at 2.5 mm, the characteristic heat transport times increase by a factor of one hundred. Likewise, at one centimeter channel height, the characteristic heat transport times for water, air, and liquid sodium for the above conditions are 6840 seconds, 4.55 seconds, and 2.09 seconds, respectively. From this, it is clear that liquid water does not approach thermal equilibrium with the channel walls as quickly as air or liquid sodium (or, in general, compared to gases or liquid metals). Air and liquid sodium therefore exhibit characteristic heat transport times within a 1 cm mesochannel that are similar in magnitude to the characteristic heat transport time for liquid water within a 250 micron microchannel, due to their substantially greater thermal diffusivities.

It is desirable to select the design of the heat exchange mesochannel such that the combination of the channel height and the thermal properties of the fluid are well matched with the thermal properties of the overall system.

The design of mesochannel sorption pumps also requires attention to mass transport within and into the sorption channel. For example, in many applications the expectation will be that the sorption pump substantially removes the solute from the process fluid. For example, it might be desirable to remove $CO_2$ from a combustion gas stream, or to remove an acid gas (e.g., $H_2S$, $CO_2$, etc) from a process stream.

A significant design tradeoff must be made for this type of process. One desire is to maximize the use of the adsorbent media capacity, nearly completely loading it with each cycle, and the other desire is to remove as much as possible of the solute from the feedstream. The adsorption media will initially load more rapidly where it is close to the flowing gas stream; i.e., where the mass transport distances are very short. Complete, or substantially complete, loading of the adsorption bed occurs last for portions of the bed that are furthest from the flowing gas stream. For this reason, the distance from the flowing gas stream to the furthest section of the adsorbent media, measured normal to the direction of flow, is of interest.

The characteristic mass transport time ($t_{mt}$) in an adsorbent channel is related to the time that it takes for a substantial degree of mass diffusion to occur into and within the adsorbent channel. Like the characteristic heat transport time, the characteristic mass transport time, for a laminar flow system, is defined to be a function of the mass transport distance and the effective mass diffusivity of the solute(s) within the overall fluid, as follows:

$$t_{mt}=L^2/D_e$$

where L is the mass transport distance and $D_e$ is the effective mass diffusivity of the diffusing specie(s) within the overall fluid. The characteristic mass transport time is therefore an attribute of fluid properties, channel dimensions, and the structure of the adsorbent media. For the calculation of the characteristic mass transport time, the effective mass diffusivity is defined to be a function of the fluid mass diffusivity and the tortuosity factor and porosity of the adsorbent media. Therefore $$D_e=D\epsilon/\tau$$

where D is the mass diffusivity of the adsorbent specie(s) in the fluid, and $\epsilon$ and $\tau$ are, respectively, the porosity and tortuosity factor of the adsorbent material in the adsorbent channel.

In calculating the characteristic mass transport time, it is important to consider geometry. In general, two types of sorption systems are of interest. One type, called a "flow-through" system, directly flows the gas to be processed through the sorption channel. The other type, called a "flow-by" system, flows the gas to be processed past the sorption channel; for a "flow-by" system, a contactor may be used, as described in Drost et al., U.S. Pat. No. 6,126,723, to separate the adsorbent media from the channel that is directly flowing the gas. In this case, sorption occurs when the gas diffuses through the contactor and into the adsorbent media. Alternately, another "flow-by" system involves having the adsorption media arranged within the same mesochannel as is used to flow the gas, so that there is a preferential flow path that is adjacent to, but not directly through the adsorption media. For example, the adsorption media might be coated on the walls of the channel, or on an "insert" that does not take up the entire channel height.

For a contactor-based, "flow-by" system, where the adsorbent channel is essentially filled by the adsorbent structure, the height of the adsorbent channel is also the mass transport length within the adsorbent channel. For a case with a 1 mm high adsorbent channel, where the ratio of porosity to tortuosity factor ($\epsilon/\tau$) for the adsorbent is 1/6, and the mass diffusivity of the fluid is $1.67\times10^{-5}$ m$^2$/sec (corresponding to $CO_2$ within a $N_2$ stream, at 298 K and 1 atmosphere pressure), the characteristic mass transport time is calculated to be:

$$t_{mt}=L^2/D_e=(1\times10^{-3}\text{ m})^2(6)/(1.67\times10^{-5}\text{ m}^2/\text{sec})=0.359\text{ seconds}$$

Likewise, if the channel had been 1 cm high, the characteristic mass transport time would have been calculated to be 35.9 seconds.

The evaluation of the characteristic mass transport time can aid in the consideration of various mesochannel sorption pump configurations; however, additional details must be considered when designing a sorption pump. To evaluate transient response, and cycle time, attention must also be paid to the chemistry of adsorption (including capacities and kinetic rates), the precise geometry and dimensions of the adsorbent channel and the adsorbent media therein, as well as the percent of theoretical capacity that the system is intended to achieve.

More generally, the cycling rate for mesochannel sorption pumps will be a function of chemistry, mass transport (including the mass diffusivity of the solute within the overall gas stream and within the adsorbent channel), and heat transport (including the thermal diffusivity of the gas and solid material within the adsorbent channel, and the characteristic heat transport time for the combination of the adsorbent channel, any heat exchange channel(s), and the structural material that connects them).

As described above, transport phenomena within mesochannels generally exhibit characteristic heat and mass transport times between milliseconds and tens of seconds. Systems of microchannels and mesochannels, in combination with appropriately chosen heat transfer fluids, can therefore be designed that exhibit transient heat and mass transport response rates on the order of tens of seconds seconds or seconds, or faster, and mesochannel sorption pumps should therefore be able to operate through the complete TSA cycle within a few minutes or in some cases, within tens of seconds or less.

During the adsorption portion of the cycle, the adsorbed gas undergoes a phase change, and heat (the heat of adsorption) is released. Unless this heat is removed as it is generated, it will cause a temperature rise within the adsorbent bed, thereby limiting the amount of gas could be adsorbed. Likewise, during desorption, the evolution of the gas consumes energy; unless the adsorbent bed is heated (corresponding to the heat of desorption), it will grow colder, thereby limiting the amount of gas that can be desorbed.

Thermochemical Compressors

Based upon the above discussion, sorption pumps can be operated as thermochemical compressors. For these cases, heat is supplied (from a heat source) during desorption, and heat is removed (to a heat sink) during adsorption. In general, temperature swing adsorption is thermodynamically classified as a heat engine cycle, with the work output being the rise in pressure (or partial pressure) of the adsorbed gas species, or the degree of separation of the adsorbed gas species from the feedstream. Therefore, the operation and efficiency of a sorption pump is governed by the same thermodynamics as other thermal power cycles.

In principal, the highest theoretical energy efficiency is achieved in a heat engine if all elements of the heat engine cycle operate in a thermodynamically reversible manner. This cannot be accomplished in a real-world system, but efforts are made to attain highly efficient systems. For example, reversible heat transfer would require that the heat transfer occur across a negligible temperature gradient, with no pressure drop due to fluid friction. Heat exchangers have been built with low pressure drop and low terminal temperature differences, thereby providing very high heat transfer effectiveness. While these units do not accomplish reversible heat transfer, the degree of irreversibility is nevertheless minimized in such devices.

In general, the thermal efficiency of a heat engine is expressed as the amount of work that is produced (W) divided by the amount of heat that was put into the system ($Q_H$), from a heat source. Heat engines must also give up an amount of heat ($Q_L$) to a heat sink. A perfect heat engine, acting as a reversible system, is known as a Carnot Cycle system, with the following thermal efficiency ($\eta_{th}$):

$$\eta_{th} = W/Q_H = (Q_H - Q_L)/Q_H = (T_H - T_L)/T_H$$

where $T_H$ is the temperature of the heat that is delivered to the heat engine, and $T_L$ is the temperature of the heat that is removed, with both being expressed in absolute temperature scales, such as degrees Kelvin or degrees Rankine. Again, this is the best that can theoretically be accomplished. So, for heat engines operating between temperatures of, say 400 K (127 C) and 300 K (27 C), the highest theoretical efficiency that could be obtained would be:

$$\eta_{th} = (400 - 300)/400 = 0.25$$

or 25%, which would be called the Carnot Cycle efficiency for a heat engine operating between these two temperature boundaries.

In actual practice, it is difficult if not impossible to approach Carnot Cycle efficiencies for a thermochemical compressor, and it is especially difficult in a sorption pump based upon adsorption. Whereas most heat engines operate with a circulating fluid as the working media, a sorption pump has a solid adsorbent mass as the working media. With each cycle, the adsorbent media and its structural housing must be thermally cycled; together, this can require significantly more heat than what would be required if only the heat of adsorption was to be provided, and likelwise can require that a substantially greater amount of heat be removed to the heat sink.

The requirement to thermally cycle a mesochannel sorption pump can result in a substantial energy penalty, because of the relatively high thermal mass of the system, unless effective thermal recuperation is provided, In general, mesochannel and microchannel technology makes use of an architecture where the structural volume is typically 40% or more of the overall hardware volume.

Many heat engine cycles make use of recuperative heat exchange as a way to improve thermal efficiciencies. For example, a Brayton Cycle gas turbine system receives an efficiency boost if the exhaust of the turbine is used to preheat compressed air, before it is heated by an internal combustion process. Likewise, an absorption-based, thermochemical compressor, which uses a liquid chemical solvent as the sorbent material, receives an efficiency boost if a recuperative heat exchanger is used to preheat the "rich" solvent prior to desorption, using heat from from the "lean" solvent after desorption.

Figure 3:
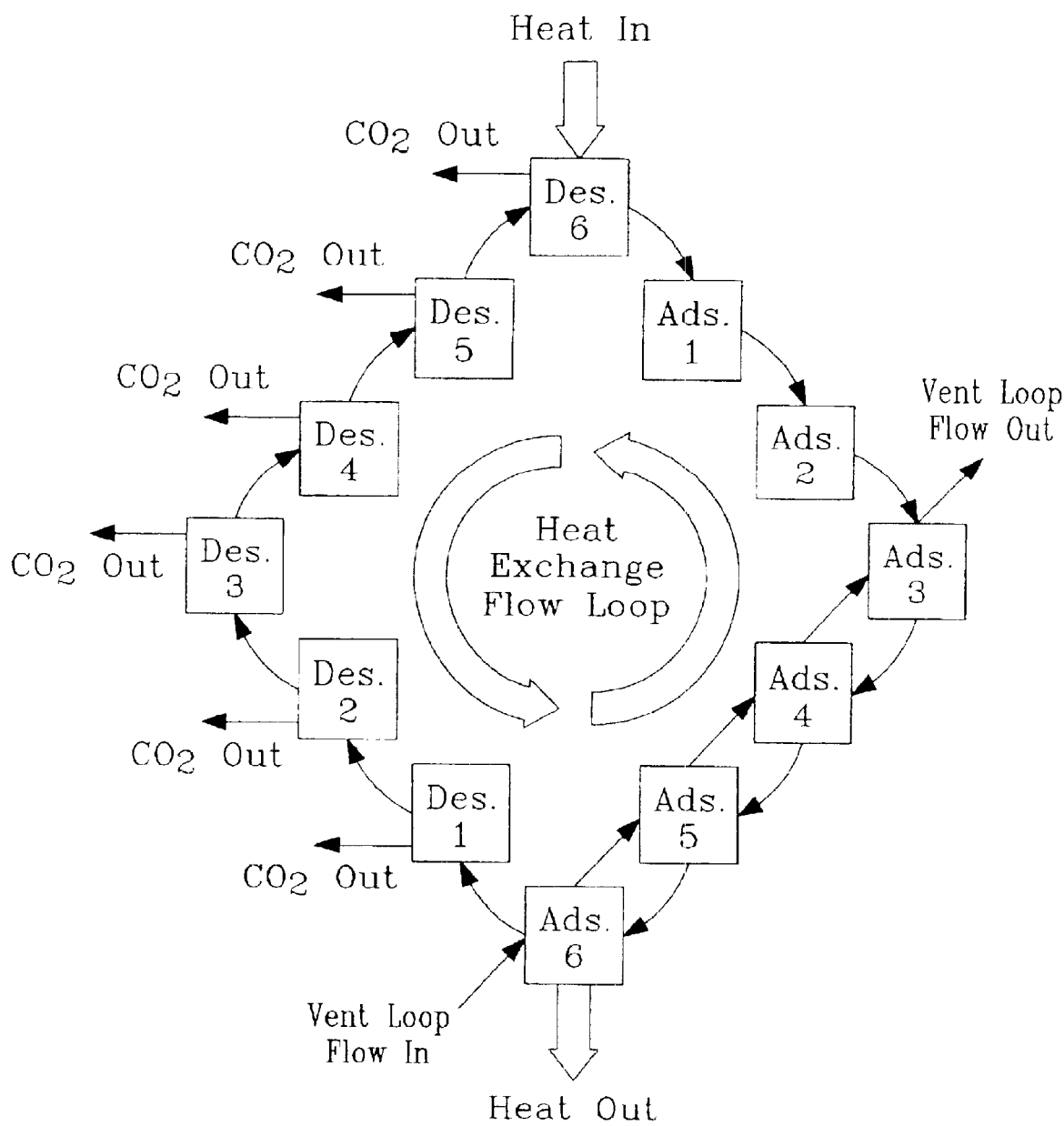
FIG. 3 schematically illustrates a system and process for performing integrated adsorption/desorption cycles.

Thermal recuperation can also be accomplished with adsorption-based sorption pumps. For example, the schematic in FIG. 3 illustrates one potential concept for a multi-cell, mesochannel sorption pump. The cycle is similar to one described by Sywulka, U.S. Pat. No. 5,419,156. Conceptually, the cells move clockwise through the cycle, while a heat transfer fluid circulates counter-clockwise through heat transfer channels in each cell. The highest temperature occurs in the cell at the top of the diagram where desorption is occurring. As the heat transfer fluid leaves this stage at its hottest temperature, it consecutively gives up heat to the cells on the left that are cycling toward the desorption step. At the bottom, the coldest cell is adsorbing. As the heat transfer fluid moves up through the cells on the right, it cools the cells moving down toward the adsorption step. In this manner, the majority of the heat associated with the thermal mass is effectively recuperated. Some heat must be provided at the desorber and removed at the adsorber, to make the system operate as a heat engine doing compression work. Note that, in actuality, the cells may not physically rotate. Rather, virtual rotation can be accomplished by transitioning the inlet and outlet points as well as the points where heating and cooling occur.

The concept of Sywulka requires a substantial amount of valving. Fluid pumps and valves for a thermally-recuperative, mesochannel sorption pump can be provided either by embedding the valves within the sorption pump structure or by connecting external valves to conduits that are connected to the structure.

Other options for thermal recuperation exist for multi-cell sorption pumps, with the overall goal still being to make use of thermal energy from a cell that is cooling, to support adsorption, and to provide heat to another cell that requires heating, to support desorption. As is shown in FIGS. 4a–4f, the continuous fluid process loop of Sywulka is replaced with thermal connections between each cell and the cells that are its immediate neighbors. The thermal connection can be made using heat exchange fluid loops or by using thermal switches, for example. Again, fluid pumps and valves can be provided either internally or externally.

Energy efficient operation requires that the recuperative heat exchange be highly effective. It is preferred that the heat exchange channels and the adsorption channels cooperate in a way such that at least 60%, or more preferably, 80%, or more preferably yet, that 90% of the thermal energy associated with operating the system is recuperated.

Thermally-Enhanced PSA

A mesochannel sorption pump can also perform PSA adsorption and, in principle, can provide for improved productivity of a PSA adsorption cycle through thermal enhancement. As noted previously, adsorption systems typically generate heat during adsorption and consume heat during desorption, cooling the adsorption media during that portion of the cycle. For conventional PSA systems, the heat of adsorption remains within the adsorption media, and the heat of desorption is taken from the adsorption media, cooling it. The net effect for conventional PSA systems is that the theoretical capacity of the adsorption media is reduced, compared to if heat had been removed during adsorption and/or added during desorption.

Thermal enhancement is not usually attempted for conventional PSA systems, because of the very long heat transport distances, and accordingly, the very much longer cycle times that would be required. As noted previously, conventional PSA systems typically have cycle periods of minutes, whereas conventional TSA systems typically have cycle periods of hours.

Mesochannel sorption pumps, however, offer shorter cycle periods that are of similar magnitude as those for PSA systems. Accordingly, a mesochannel sorption pump can perform thermally-enhanced PSA adsorption and/or desorption, thereby providing enhanced utilization for a given amount of adsorbent. More specifically, a thermally-enhanced PSA sorption pump, incorporating mesochannels for heat exchange and adsorption/desorption, provides cooling of the adsorbing media during adsorption of a gas specie(s) at one pressure (or partial pressure) and/or heating of the adsorption media during desorption at a lower pressure (or partial pressure). While this operation will typically require thermal energy for operating the process, the size of the adsorption system and the amount of adsorption media are reduced. Alternately, whereas in some applications the conventional PSA system might require high pressure operation for adsorption, requiring electrical or mechanical energy to support the operation of compressors, a thermally-enhanced PSA mesochannel sorption pump could be operated as part of a process cycle with a lower inlet pressure required, therefore reducing compressor power costs. In particular, this could be valuable for an operation where there is a high value associated with electrical or mechanical power compared to a lower value associated with relatively low temperature heat, especially if waste heat is available from another operation at a suitable quality.

DESCRIPTION OF PREFERRED EMBODIMENTS

FIG. 1a illustrates a simplified schematic of an adsorption process 2. Feed gas is fed in through tube 4 and valve 6, through inlet 7 into adsorbent layer 8. Simultaneously with passing a gas through layer 8, a coolant flows through valve 9 and then through heat exchanger 10 which removes heat from adsorbent layer 8. Cooling is necessary because more gas is adsorbed at low temperatures and because adsorption generates heat. Gas that is not adsorbed in the adsorption layer passes out through outlet 12 and valve 14. At the end of the adsorption cycle, feed gas is shut off.

Figure 1B:
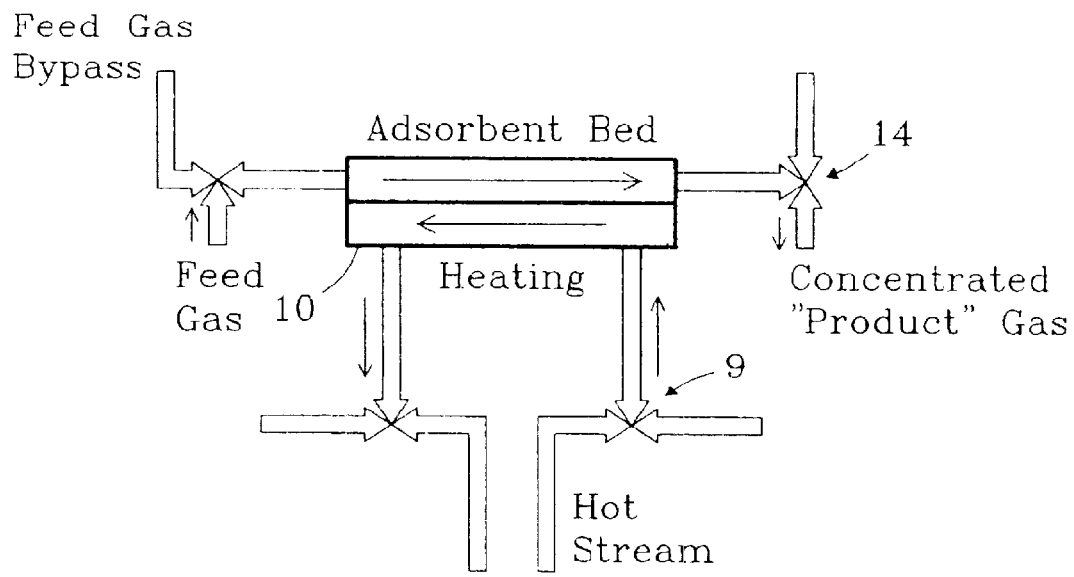
FIG. 1b schematically illustrates a simplified desorption process.

An apparatus in the desorption mode is schematically illustrated in FIG. 1b. Heat exchange media control valve 9 is switched to pass a relatively hot fluid through the heat exchanger 10. Heat is required because more gas is desorbed at high temperature and desorption causes cooling of the adsorbent layer 8. Valve 14 can be switched to redirect flow and, if desired, the desorbed gas can be collected.

Figure 2:
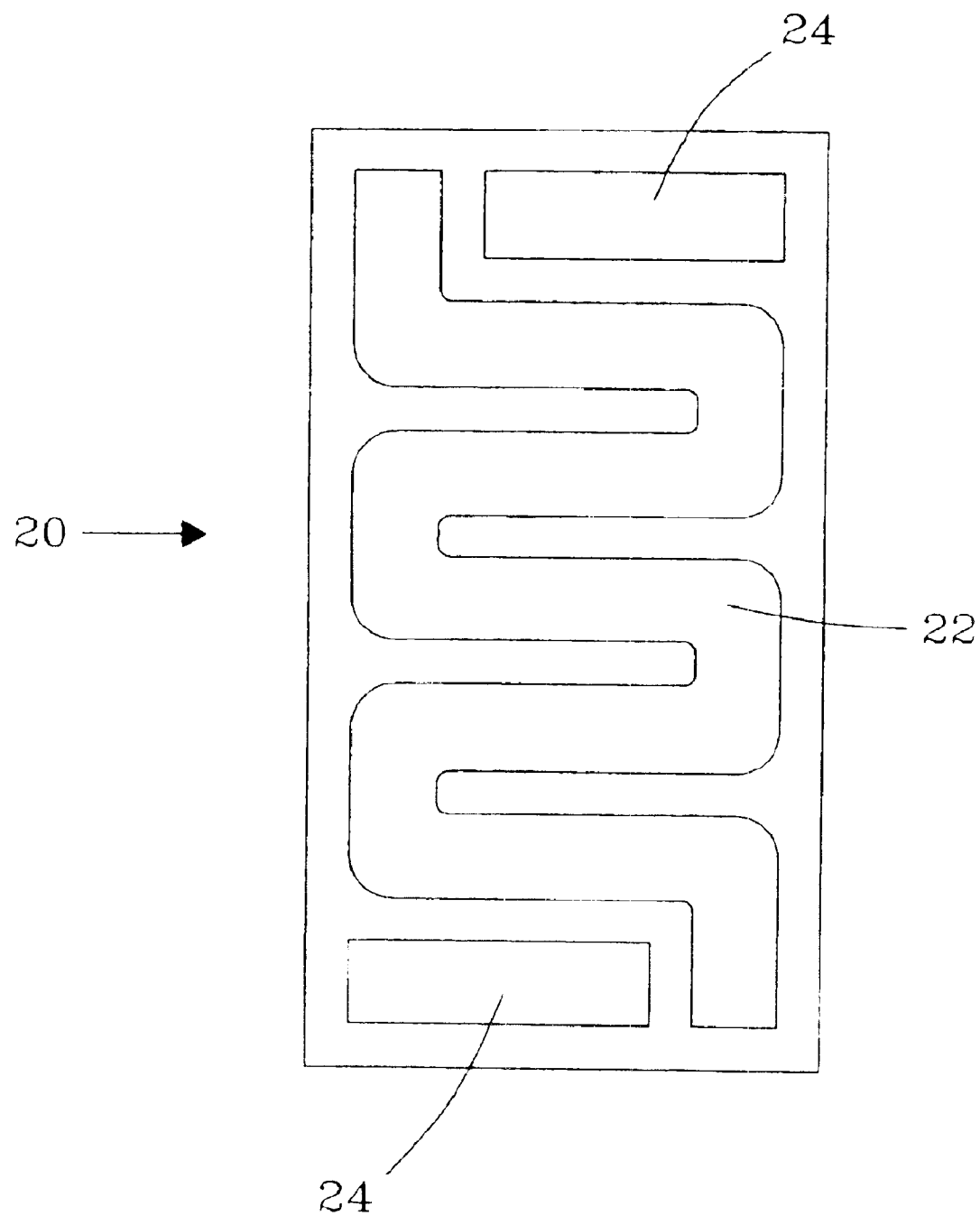
FIG. 2 is a top down view of an adsorption layer having a serpentine adsorption channel.

FIG. 2 is a top-down view of an adsorbent layer 20 having a serpentine adsorption mesochannel 22. During operation, the adsorption mesochannel 22 contains adsorption media (not shown). Heat exchange fluid headers 24 can transport fluids to multiple layers of heat exchanger channels.

Although the adsorption channel 22 can take a variety of shapes, a serpentine configuration may be desirable for some applications. The height of the adsorption channel (height is the direction out of the page in FIG. 2 and is measured from the bottom of the channel to the top) is 1 cm or less, more preferably between 0.1 and 10 mm, and still more preferably between 1 and 5 mm. Controlling the height is important because it limits the time for heat and mass transport and enables faster cycling time. The length of the adsorption channel 22 is in the direction of the net flow and usually determined based upon the pressure drop that can be allowed, and other considerations such as the application for which the invention is to be used. There is no limit on channel length; however, for most applications the length of the adsorption channel is 25 cm or less, and more preferably 10 cm or less, and still more preferably between 1 cm and 6 cm. The width of the adsorption channel 22 is also a function of the design of the specific embodiment, and is often based upon internal design considerations, such as the need for the walls that define the width of the channel to serve as structural ribs during the fabrication of the invention. The width is generally perpendicular to the height and length and is measured at any cross-section of the flow channel, and is not limited but is preferably 10 cm or less, more preferably 5 cm or less, or still more preferably between 5 mm and 3 cm.

The structural material for the adsorption layer may be metal but is preferably a low thermal mass material such as plastic. It has been found that a plastic adsorption layer combined with a metal heat exchanger interface to the adsorption channel results in superior desorption properties measured as the fraction of gas desorbed as a function of time, thus enabling faster cycling times. Preferably the channel is cut completely through the adsorption layer and the adsorption media preferably contacts heat exchangers on two sides. A thinner adsorption layer reduces device size, weight and thermal mass (allowing more rapid temperature swings).

Gas adsorption media (which are solids) are well-known in the art and can be selected for selectivity to the desired gas. For carbon dioxide and water vapor, 13× zeolite pellets are one preferred example. In order to maximize capacity it is desirable to maximize the quantity of adsorption media in the adsorption channel; however, there is a trade off with limitations on mass transfer rates—a more completely filled adsorption channel decreases the gas flow rate at a given pressure. Therefore, it is preferred to use pellets or particles such that gas can flow and diffuse through interstices between particles. Other preferred adsorbent media forms include porous, flow-through foams, felts and honeycombs. In preferred embodiments, the adsorbent channel is more than 50% filled, more preferably at least 80% filled, with adsorption media measured as a percent of the total volume of the adsorption channel where both particles and the accompanying interstitial space is counted as "filled." In other preferred embodiments, the adsorption media fills at least 60%, more preferably 80%, and still more preferably at least 90%, of the cross-section (measured perpendicular to gas flow) of at least one portion of the adsorption channel—in this fashion essentially all of a gas passing through even a short adsorption channel will contact the adsorption media. Advantages of passing gas directly through the adsorbent include better opportunities to provide heating and cooling to the sorption media, since heating/cooling streams can be placed on both sides of the media, and desorption occurs into a smaller void space, therefore providing greater compression (for thermochemical compressor applications). In addition to the sorption media, in some preferred embodiments, the adsorption channel also contains heat transfer agents such as fins or pins that project from the channel walls or interspersed thermally conductive materials such as graphite or metal fibers or flakes.

The inventive apparatus preferably contains at least one microchannel heat exchanger in thermal contact with the adsorption layer. The term "microchannel" refers to a channel having at least one dimension of 1 mm or less. Preferably, the microchannels have a maximum height of 1 mm and a width of 10 cm or less and any length (length is direction of fluid flow through the channel), more preferably a height of 100 to 500 micrometers ($\mu$m). In some preferred configurations, each adsorption layer is sandwiched between heat exchangers. The heat exchanger layer preferably has a thickness (in direction of heat transport to/from adsorption layer(s)) of 200 to 2000 $\mu$m, including the heat exchange fluid channel and the wall between the heat exchange channel and the adsorbent layer. Preferably, the heat exchanger is completely or at least partially composed of a highly thermal conductive material; low thermal mass for the heat exchange structure is also desired. The highly thermal conductive material of the heat exchanger preferably has approximately the same shape as the adsorption channel (e.g., serpentine shaped heat transfer material over and/or under a serpentine-shaped adsorption channel) because this configuration operates to selectively heat the adsorption media with reduced heating of other components of the device such as other portions of the adsorption layer, and may also increase the thermal cycling rate. In some preferred embodiments, the highly thermal conductive material of a heat exchanger overlaps at least 80%, more preferably at least 90%, of the adsorption channel(s). Conversely, the adsorption channel(s) preferably overlaps at least 80%, more preferably at least 90%, of the fluid flow portion of a heat exchanger. "Overlap" is determined by viewing the device in the direction of stacking and gauging the superposition of one element on another. While devices have been tested with heat exchangers that are shaped with serpentine configurations that conform to the shape of the adsorption channel, the inventors also envision heat exchange layers having a shaped, thermally-conductive microchannel regions with surrounding areas of nonthermally-conductive material.

In place of, or in addition to channels for fluids, heat sources may include electrically resistive heaters, light-absorbing surfaces or radioisotopes. Other process technology such as an exothermic chemical reactor or a nuclear powered reactor, are also possible heat sources. Non-sorbed components of the gas that contacts the adsorbing media may remove also remove heat during adsorption, therefore serving as a heat sink or as a portion of a heat sink. Alternately, the heat source and/or the heat sink might each be part of a heat pump system, which elevates the low temperature heat from adsorbing layers to a higher temperature heat, for desorption layers. In some embodiments, the apparatus is configured with other process technologies which produce low-temperature waste heat, such that the waste heat from the other process technologies is the heat source for the inventive apparatus, or the heat sink for the apparatus might be another process technology that requires low-temperature heat at approximately the temperature at which heat is removed during or prior to adsorption.

The heat transport fluid in the heat exchanger is preferably water, but any suitable heat transfer fluid may be employed. For example, liquid metals, hydrocarbon- and silicone-based fluids, many gases (such as air, nitrogen, carbon dioxide or hydrogen) and phase change fluids (such as refrigerants) are also suitable heat transfer fluids for various embodiments of this invention. As shown in the Examples section, higher flow rates increase the rate of thermal change and thus decrease cycle time; however, excessively high flowrates can increase thermodynamic irreversibilities, and therefore can cause the system to be less energy efficient.

For good heat transfer characteristics, compactness and ease of construction it is preferred that the adsorption layer or layers and the heat exchanger or heat exchangers have planar surfaces or complementary (lock-and-key) surfaces such that the components stack on top of each other.

In another aspect of the invention, a collection of adsorption cells are arranged so that recuperative heat exchange is provided, through the incorporation of a heat exchange fluid. FIG. 3 depicts one schematic for this approach, with twelve mesochannel adsorption cells (each having one or more mesochannels with adsorbing media and one or more heat exchangers). While one portion of the system is adsorbing, another portion is desorbing, and the remaining cells are either being preheated (for desorption) or cooled (for adsorption), using the heat exchange fluid. Heat exchange fluid from the desorbing cell (or cells) passes into another cell (or cells) where it preheats an adsorbent—at the same time, heat exchange fluid from the heat exchanger of an adsorbing cell (or cells) passes into another cell (or cells) where it precools an adsorbent. The heat exchange fluid could be routed through mesochannels that are embedded within each adsorption/desorption cell. This approach is similar to the concept that is described in an U.S. Pat. No. 5,419,156 (incorporated herein by reference), which describes an overall concept for adsorption compressors in general but does not apply them to adsorption/desorption using mesochannels or microchannels.

Figure 4A:
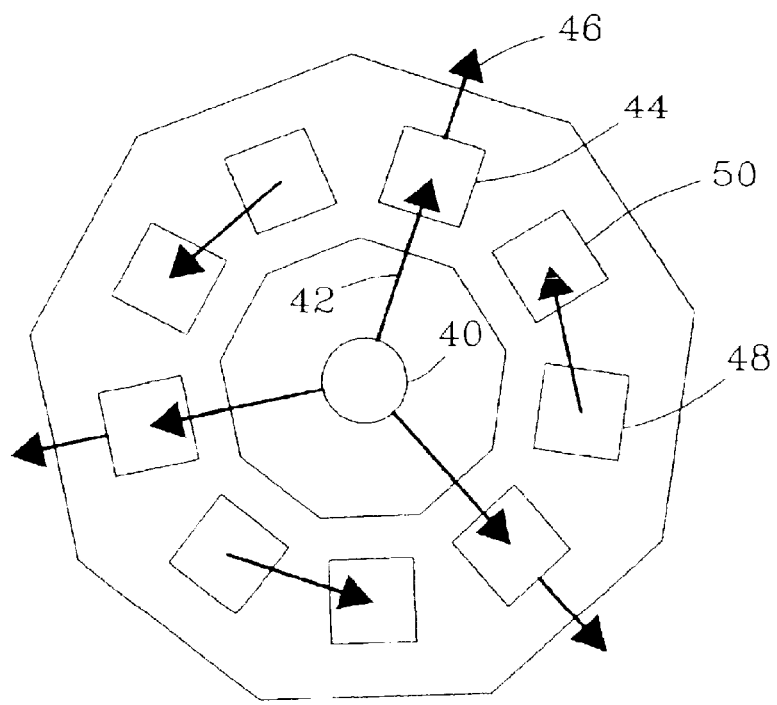
FIGS. 4a–4f schematically illustrates a system and process for performing integrated adsorption/desorption cycles.

Another approach is schematically illustrated in FIGS. 4a–4f. This scheme preferably makes use of cells in multiples of 3. The illustrated device (seen from top down in each illustration) contains 9 cells, where each cell is represented as a box. In FIG. 4a, heat is transferred from heat source 40 along the path indicated by arrows 42 into cells 44. The heat source 40 could contain, for example, hot fluid passing through a pipe, a light-absorbing surface, an electrical resistor, or a container with a radioisotope, or a thermal switch or other thermal conduit providing heat flow from another process technology. The cells 44, operating at the hottest temperature of the cycle, desorb gas 46 that exit the cells through valved outlets (not shown). Simultaneously, warm cells 48 transfer heat to adjacent cold cells 50.

Figure 4B:
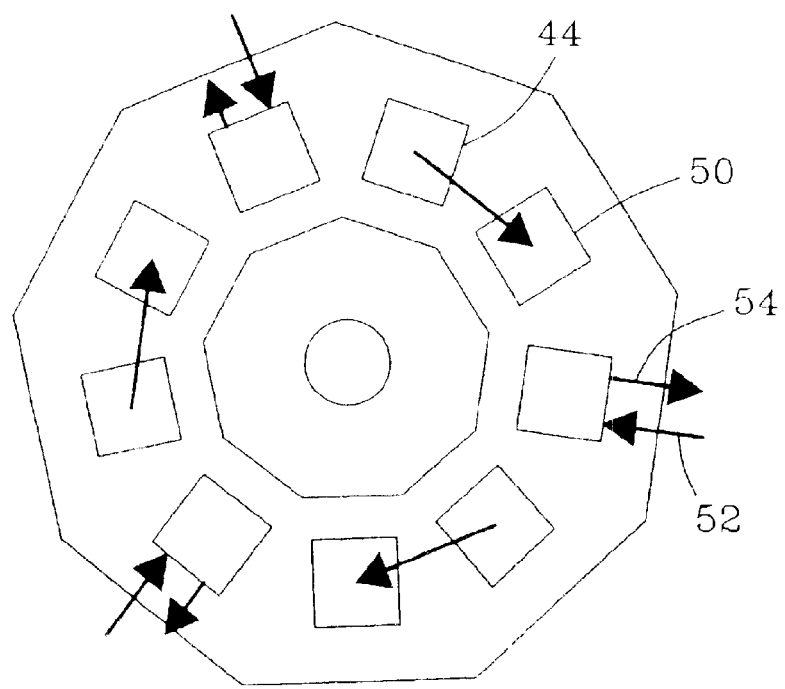

In a subsequent step, FIG. 4b, the outlets of cells 44 are closed and heat from cells 44 is transferred to warm adjacent cells 50. Simultaneously, gas 52 is being adsorbed in cell 48 while heat 54 is transmitted to a heat sink (not shown). The heat sink could be, for example, a coolant fluid in a heat exchanger, another process technology requiring heat at about or less than the temperature of adsorption, or simply the atmosphere.

Figure 4C:
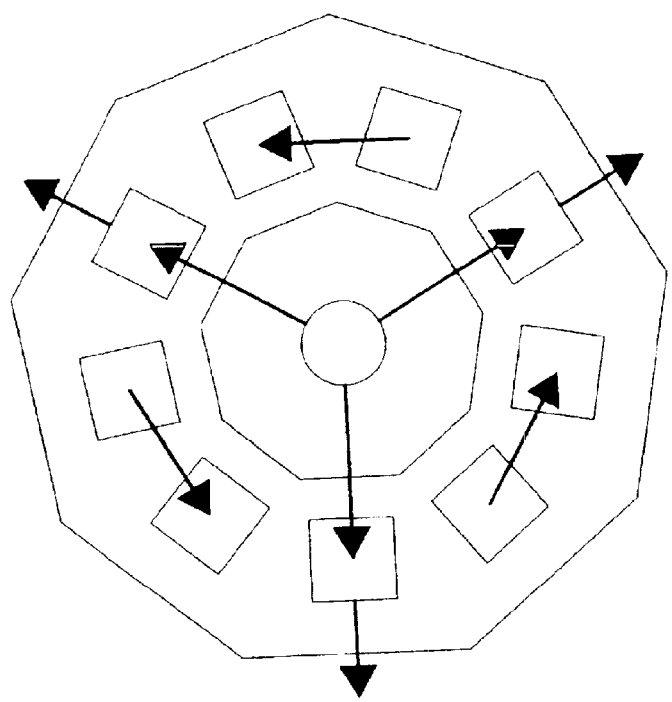

In a subsequent step, FIG. 4c, heat from the heat source is transmitted to cells 50 which then desorb adsorbed gas. Simultaneously, warm cells 44 transfer heat to adjacent cold cells 48.

Figure 4D:
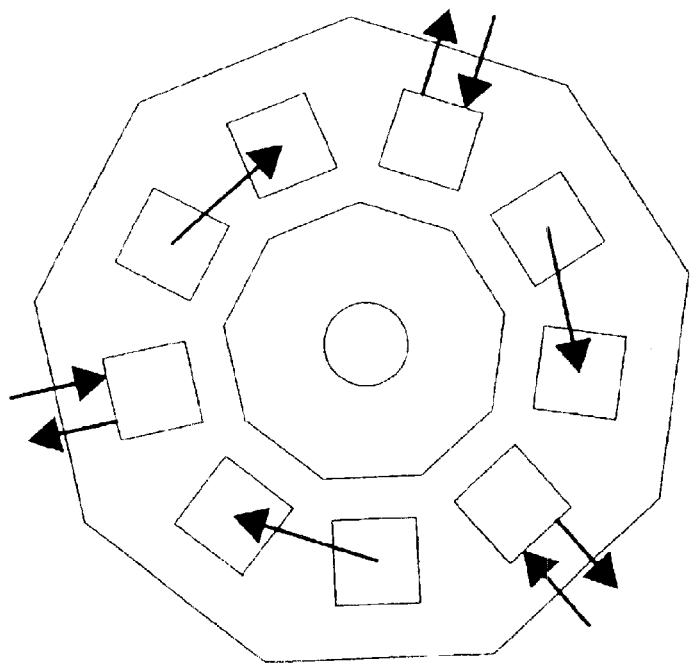
Figure 4E:
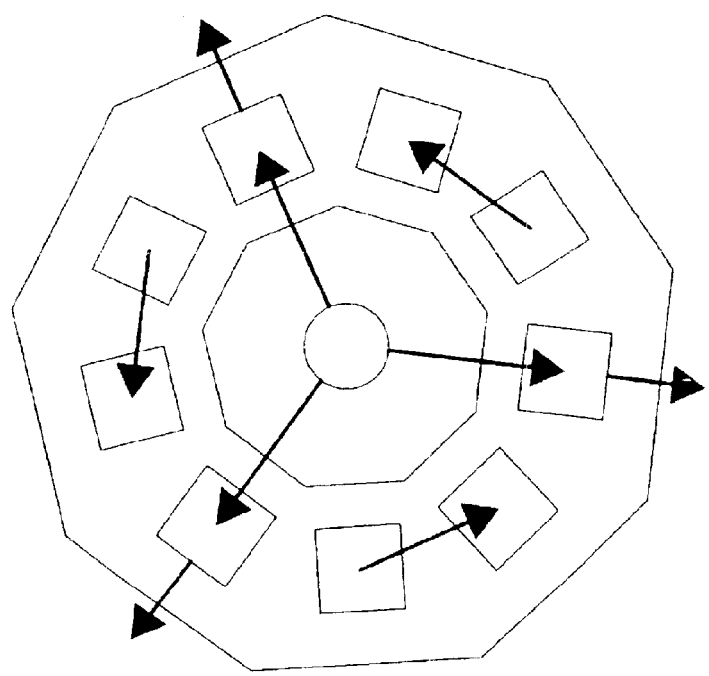
Figure 4F:
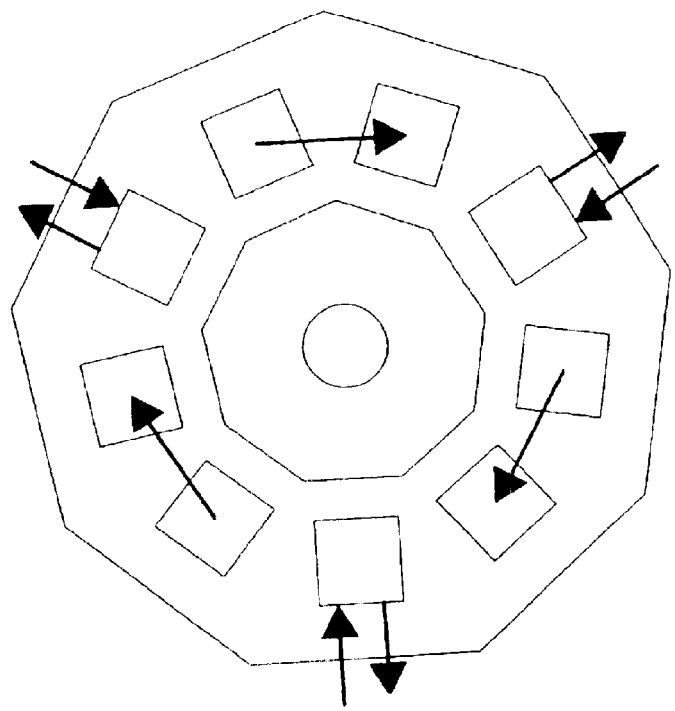

In a subsequent step, FIG. 4d, the outlets of cells 50 are closed and heat from cells 50 is transferred to warm adjacent cells 48. Simultaneously, gas 52 is being adsorbed in cells 44 while heat 54 is transmitted to a heat sink (not shown). Subsequent steps are shown in FIGS. 4e and 4f.

The invention also includes methods of making sorption apparatus comprising the joining together the adsorption layer(s) and the heat exchanger. For all-metal units, bonding is preferably by diffusion bonding. Plastic-containing units may be bonded by adhesives, by compression fittings, diffusion, or other methods. The apparatus may likewise contain or be assembled from ceramics, and sealed using various methods.

The inventive gas adsorption methods all involve sorption of a gas onto adsorption media followed by desorption. In one aspect, a gas is passed into a channel that contains adsorption media (preferably without first passing through a contactor) and, simultaneously heat is transported to or from a heat exchanger to any point in the adsorption media over a net distance of less than about 1 cm. The net effect is that the gas is concentrated or compressed, with the energy for the process being thermal energy (heat). Since a heat source and a heat sink are required, the thermodynamic cycle is that of a heat engine. Further, because the heat and mass transport distances are short, along the smallest dimension of microchannels and/or mesochannels, the system operates with a fast cycling rate. The longest heat transport distance from any point in the adsorption media is less than about 1 cm; more preferably less than about 8 mm, and still more preferably less than 5 mm. In some cases, the heat transport distance could be larger. To enhance heat transport, a porous conductor could be placed in the adsorption channel. In another aspect, heat is selectively added and removed from the adsorption layer with relatively low level of heat transfer to other portions of the adsorption layer. In yet another aspect, heat is transferred between a heat exchanger composed of a high thermal conductivity material and an adsorption layer composed of a relatively low thermal conductivity material.

In yet another embodiment, gas is desorbed from the adsorbent in the adsorption channel by pressure swings. Although heat exchangers are not necessary for pressure swing adsorption, there could be heat exchangers to enhance rate and/or capacity.

The invention also includes methods of gas separation that include the inventive gas adsorption methods as steps in the process. Examples include separation of $CO_2$ from exhaled air, removal of $H_2S$ from natural gas to "sweeten" the gas, removal of $CO_2$ and/or $CO$ from a hydrogen rich stream (such as from a reformer) for a fuel cell power plant, water removal from air (to dry it) and more complex separations, where the sorption device is but one part of the process, such as to purify argon or nitrogen such as for instrument use.

Alternatively or in addition to describing the invention in terms of size, composition, etc., the invention can be described in terms of other measurable properties such as rapid cyclability and gas adsorption/desorption as a function of hardware volume.

The use of the thin adsorption channel enables faster heat transfer, which can be expressed as the heat transfer power density. In order to enable rapid cycling, heat is exchanged between the adsorbent channels and the heat exchange channels at a rate of at least 0.5 watts per cubic centimeter, more preferably over a rate of at least 1.0 watts per cubic centimeter, and yet more preferably over a rate of at least 5.0 watts per cubic centimeter, measured over a complete cooling and heating cycle where the volume is the adsorption cell volume, as previously defined. The upper limit of heat transfer in the present invention is limited as the thickness of the adsorption layer approaches zero. In some preferred embodiments, the rate of heat transfer is between about 1.0 and 6.0 W/cc.

In some preferred embodiments, the inventive apparatus possesses rapid desorption capability such that, if the adsorption media is replaced with an equal volume of 13× zeolite, with a bulk density of 0.67 grams per cubic centimeter, and this zeolite is saturated with carbon dioxide at 760 mm Hg while at 5° C., and then warmed to 90° C. (by passing 90° C. water through the heat exchanger(s)) while maintaining the output at 760 mm Hg, then at least 50% of the theoretical capacity of the zeolite is desorbed within 1 minute. More preferably, at least 70%, and still more preferably at least 90%, of the adsorbed carbon dioxide is desorbed within 1 minute. The invention can also be characterized by productivity. In an alternative test, under the same conditions as above, at least 0.015 g $CO_2$, more preferably at least 0.025 g and in some embodiments 0.015 to about 0.04 g $CO_2$, per ml of apparatus is desorbed within one minute. The rapid desorption capabilities of the invention are generally insensitive to the type of adsorbent media; the purpose of characterizing certain embodiments of the invention in this fashion is to provide a measurable criterion that can be used to characterize the hardware design and thus characterize the rapid desorption property of the invention.

In preferred embodiments the invention possesses rapid cyclability such that at least 70% (more preferably about 80% to about 95%) of the theoretical capacity of the adsorbent media is utilized in at least two consecutive adsorption-desorption cycles, each cycle being accomplished in a period of two minutes, as measured by a test in which a pure gas is passed into the adsorption channel for 1 minute, for the sorption portion of each cycle, at a flow rate such that the total amount of gas equals 1.5 times the theoretical capacity (the capacity of a sorbent at infinite time) of the adsorption media, and 10° C. water is simultaneously passed through the heat exchanger(s), and then the gas flow is shut off and the adsorbent layer(s) are heated, during the desorption portion of each cycle, by passing 90° C. water through the heat exchanger(s) for 1 minute. In this measurement, the pure gas should be selected to match a typical target gas for the selected adsorbent media.

The inventive systems can also exhibit excellent stability and, in preferred embodiments, productivity decreases by less than 10% even after 100 cycles.

In typical applications, multiple adsorption layers are interleaved with multiple heat exchanger layers into single units. Preferably, an integrated unit will sandwich each adsorption layer between two heat exchangers. More preferably a unit will contain at least 5 adsorption layers and 6 heat exchange layers. In some embodiments, larger volumes of gases can be separated with units containing at least 50 adsorption layers interleaved with 51 heat exchangers.

In a preferred embodiment, a mesochannel adsorption cell is designed so that adsorbent media can be added or removed after bonding. The adsorption channel(s) can be made longer or disposed further to one side than the heat exchange channels. In this design, the cell can be opened (such as by cutting or removing bolts) and sorbent media removed and/or added without opening the heat exchange channels. The unit would then be resealed by welding, compression fitting, or other methods.

Figure 5:
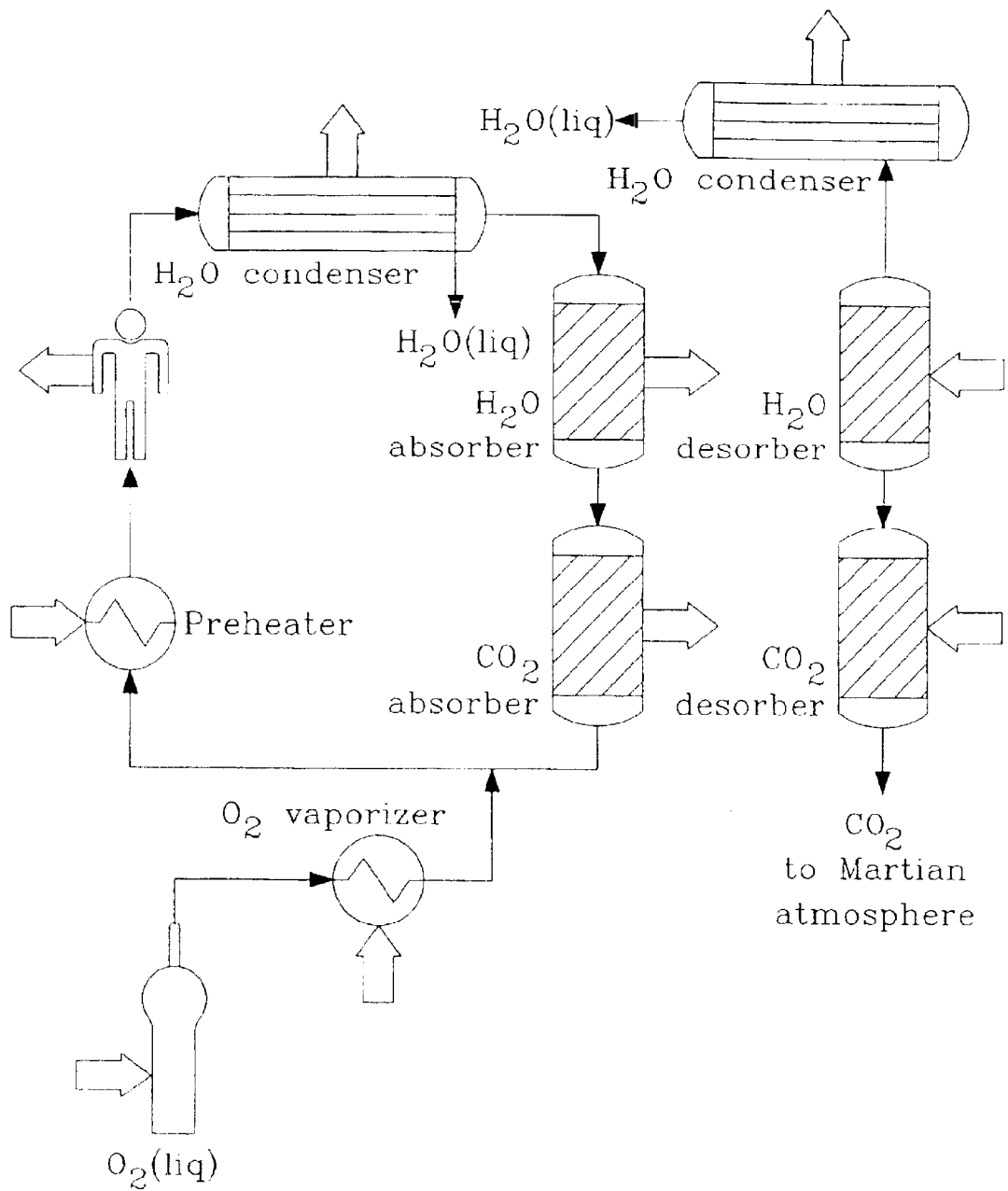

An air treatment system for an astronaut or like is illustrated in FIG. 5. The water adsorber may contain silica gel, or zeolite, or other suitable adsorbent; likewise, the $CO_2$ adsorber may contain zeolite or other preferred adsorbent. For each specie to be adsorbed (e.g., water and $CO_2$) there are two sorption cells, one that is used at a given time for treatment and one that is being regenerated by addition of heat. In a preferred embodiment, the system would consist of multiple sorption cells for each specie to provide improved thermal recuperation. Simultaneous regeneration results in a reduction in required adsorbent mass as compared to a non-regenerated system using the same adsorbent media. The mass and volume of adsorbent required decreases linearly as the cycle time decreases. For a typical 4-hour mission, a system regenerated in 4-minute cycles requires about 60 times less adsorbent than a conventionally-constructed non-regenerated system.

While the invention has been described with particular attention to carbon dioxide, it should be recognized that the inventive apparatus and methods are equally applicable to other gases. For example, by proper selection of conditions and adsorption media, the inventive apparatus and methods could be used to separate, or modify the partial pressures of: refrigerants, $H_2S$, $CO$, $H_2O$, $CO_2$, $H_2$, hydrocarbon gases, and many other organic and inorganic gases or vapor species, etc.

EXAMPLES

Relatively small adsorption separation and thermochemical compression units are possible utilizing mesochannel adsorption beds and/or heat exchangers, because of improved rates of heat and mass transfer in small scales. These improvements result in TSA devices that can be cycled more rapidly, which in turn reduces the mass of adsorbent necessary to achieve a target separation.

Example 1
Adsorbent Mass Reduction for Rapid Thermal Cycling

As a practical test case, consider the adsorption and desorption of pure $CO_2$ from zeolite 13x at near atmospheric pressure. A vendor-supplied zeolite 13x isobar at 760-mm Hg $CO_2$ pressure shows the equilibrium $CO_2$ capacity q varies nearly linearly with temperature T, over the range of $-50°$ C. to $100°$ C., per the relationship $$q = \frac{24.9 - 0.115T}{100} = 0.249 - 0.00115T \qquad (1)$$

Here, the units of q are kg $CO_2$/kg zeolite and T is in degrees Celsius (C). The theoretical working capacity per cycle $q_w$ for adsorption at a low bed temperature $T_l$ and desorption at a higher temperature $T_h$ under the isobaric conditions is therefore expressed as $$q_w = 0.00115(T_h - T_l) = 0.00115\Delta T = \frac{m_{desCO2}}{m_{ads}} \qquad (2)$$

The working capacity $q_w$ is the maximum amount of gas desorbed at $T_h$ when the gas is adsorbed to equilibrium loading at $T_l$. Experimentally, the actual working capacity was determined from the known amount of zeolite in the adsorbent bed and the volume of $CO_2$ desorbed, where the desorbed volume is related to the mass of $CO_2$ desorbed through the ideal gas law.

In the simple case described above, a single sorption unit is operated in an adsorption stage and a desorption stage according to the schematic shown in FIG. 1. The combination of a gas adsorption phase and a desorption phase defines a single cycle of duration $t_{cyc}$. The mass production rate of gas stripped from the feed gas and desorbed as "product" gas, $CO_2$ in this case, is simply given by $$r_{gas} = r_{CO2} = \frac{m_{desCO2}}{t_{cyc}} \qquad (3)$$

Substituting Equation (3) into (2) provides a relationship between cycle duration and the mass of adsorbent required to achieve a given production rate.

$$m_{ads} = \frac{r_{CO2}t_{cyc}}{0.00115\Delta T} = \frac{r_{gas}t_{cyc}}{q_w} \qquad (4)$$

Note the linear relationship between the mass of adsorbent needed to achieve the production rate and the cycle time. Thus, the rapid cycles achievable in a mesochannel adsorption device reduce the amount of adsorbent needed to process a given amount of gas. The mass of adsorbent can be reduced by more than 100 times with the mesochannel approach, because the working capacity is reused frequently.

Several mesochannel adsorbers with integrated microchannel heat exchangers were tested under isobaric (atmospheric pressure, typically ~750 mm Hg) conditions and operated in a two-phase cycle. In one test case, a stainless steel device (described in detail in Example 4) containing 1.2 g of zeolite 13x(180–212 μm particle size) was operated with a minimum adsorption temperature $T_l$ of $12°$ C. and a maximum desorption temperature $T_h$ of $77°$ C. (Water was flowed through the heat exchanger at 80 mL/min, and the hot and cold reservoirs were set to 90 and $5°$ C., respectively.) Pure $CO_2$ was fed to the zeolite at the rate of ~50 mL/min during a ~60 s adsorption phase in which the adsorbent was cooled from $T_h$ to $T_l$. The desorption phase, including the time to heat from $T_l$ to $T_h$, was also ~60 s. As defined above, the cycle time $t_{cyc}$ was 2 min. About 46 mL of $CO_2$ (measured at room temperature, ~$22°$ C.) corresponding to 0.084 g $CO_2$ was desorbed. The theoretical working capacity for these conditions as determined from Equation (2) is 0.090 g $CO_2$. Therefore, 93% of the theoretical working capacity was measured experimentally. The less than maximum working capacity for the device is thought to be due to partial water "poisoning" of the adsorbent. Water is strongly adsorbed on zeolite 13x, and the adsorption device was not heated sufficiently to remove all water before the $CO_2$ experiment.

Figure 6:
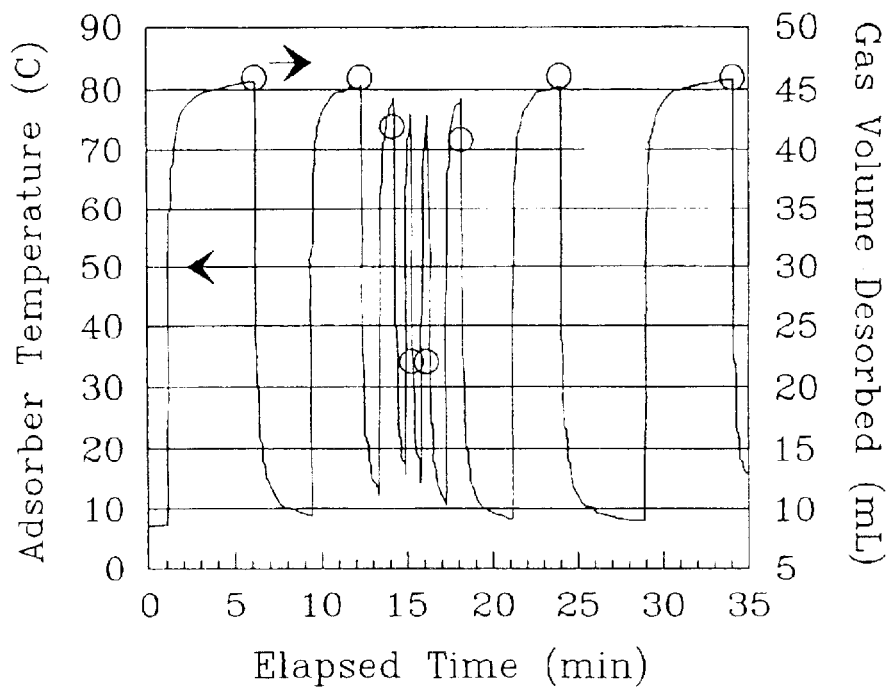
FIG. 6 is an experimentally obtained plot of adsorbent temperature vs. time for multiple cycles of an inventive apparatus. Selected measurements of gas volumes desorbed are indicated by the open circles.

FIG. 6 shows bed temperatures for a series of 1, 2, 6, and 10 minute adsorption/desorption cycles. The volume of gas measured at the end of each desorption cycle is indicated by the open circles. The desorbed $CO_2$ volume consistently reached 46 ml for the 6 and 10 minute cycle times and about 42 ml for the 2 minute cycles. Only about 22 ml $CO_2$ was desorbed in the 1 minute cycle; however, only about 25 ml of $CO_2$ was delivered to the bed during the adsorption swing. Tests with higher feed flow rates resulted in larger recovered gas volumes. The theoretical working capacities, based on measured temperature differentials, were about 52 ml for the 6 and 10 minute cycles and about 47 ml for the 2 minute cycle. Therefore, better than 80% of the theoretical working capacity was achieved in each of these cycles. As can be seen in the figure, the devices exhibited excellent cycle-to-cycle consistency.

Example 2
Adsorbent Mass Reduction for a Thermochemical Compression Scheme

Example 1 describes an isobaric process, but many adsorption processes are not isobaric. Consider, for example, an application in which the goal is to achieve $CO_2$ compression thermochemically using a mesochannel adsorption system. Here, it is proposed to use a thermal swing adsorption process to capture (adsorb) $CO_2$ at low temperature and low pressure (e.g., ~6 mm Hg) and deliver (desorb) $CO_2$ at higher temperature and pressure (e.g., 760 mm Hg) to a fuel-producing chemical reactor. Since adsorption, not desorption, is favored by higher partial pressures of the adsorbed gas species, it is necessary to operate the thermal swing over a sufficient temperature range to have a net production of gas in each thermochemical compression cycle.

For demonstration purposes, we consider adsorption at −50° C. and 6 mm Hg of $CO_2$ and desorption at 100° C. and 760 mm Hg of $CO_2$, to provide greater than 125-times compression. The experimental results discussed in Example 1 shows that commercially available adsorption isobars and isotherms for $CO_2$ on zeolite 13x can be used to successfully scale the adsorption system. The difference in the low and high temperature equilibrium $CO_2$ capacity values obtained from the literature is the theoretical capacity ($q_w$) per sorption cycle for these operating conditions $$q_w = 0.0485 = \frac{m_{desCO2}}{m_{ads}} \quad (5)$$

It follows then, per the discussion in Example 1, that the mass of zeolite needed to produce compressed $CO_2$ at a given rate is linearly related to the cycle time $$m_{ads} = \frac{r_{CO2} t_{cyc}}{0.0485 \eta_{ads}} \quad (6)$$

Where $r_{CO2}$ is the rate of $CO_2$ produced at higher pressure and $t_{cyc}$ is cycle time. The efficiency factor $\eta_{ads}$ is included in Equation (6) to account for extra adsorbent mass that may be necessary if the system is not operated at 100% capacity. This might occur if the system was not operated until equilibrium conditions were achieved (i.e., the maximum $q_w$ is not attained in each cycle) or if a fraction of the bed capacity for $CO_2$ was lost to other species (e.g., water). Based on experimental results for isobaric conditions, efficiency factors greater than 0.9 are possible in properly configured and conditioned mesochannel adsorption devices (see Example 1).

Assuming temperature and pressure operating limits as given above and an identical efficiency factor of 0.9 for both processes, the adsorbent mass requirements for the two approaches can be compared. Per Equation (6), only ~1.3 kg of zeolite 13x is needed to produce compressed $CO_2$ at an intermediate rate (e.g., $r_{CO2}\cong 20$ kg/day) in a mesochannel device with a cycle time of 4 minutes. On the other hand, about 60 times that mass of zeolite (~80 kg) is needed for an adsorption thermochemical compression process cycled once in four hours, as is more typical of conventional TSA processes.

Figure 7:
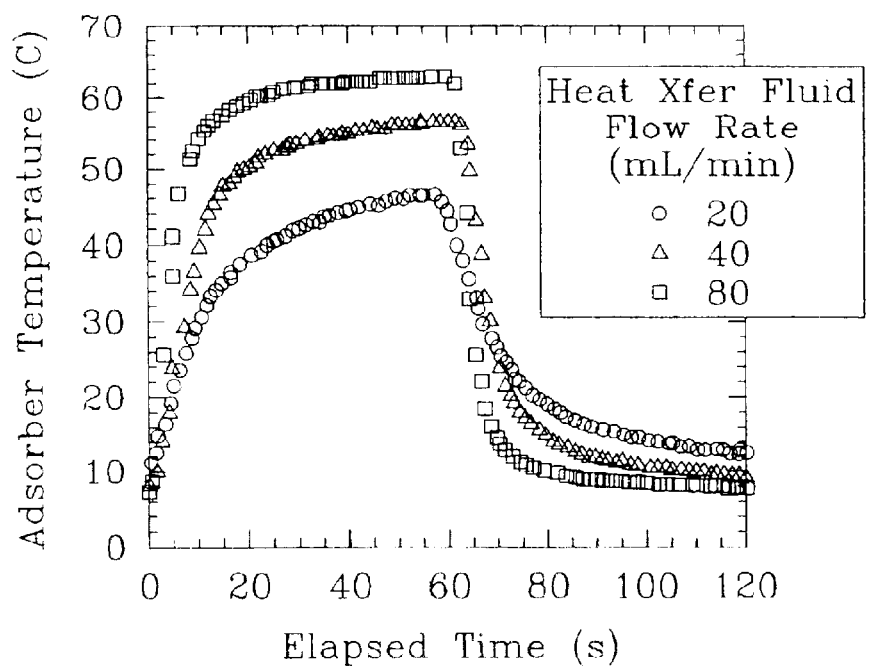
FIG. 7 is an experimentally obtained plot of adsorbent temperature vs. time for one cycle of an inventive apparatus at varying flow rates of heat exchange fluid through the heat exchanger.

Example 3
Rapid Thermal Swing Adsorption Cycles in Mesochannel Devices Demonstrated FIG. 7 shows the rapid thermal-swing capability for an all-metal mesochannel adsorber in a series of 1-minute heating and cooling phases. (In separate tests, it was determined that the heat-exchange surface measured temperatures depicted in the figure are representative of the zeolite bed temperature to within 1 to 2° C.). As the heat-exchange fluid flow rate was increased from 20 mL/min to 80 mL/min, the maximum and minimum adsorber temperatures approached the hot (70° C.) and cold (5° C.) reservoir temperatures. A larger temperature differential between adsorption and desorption cycles increases the zeolite working capacity, and therefore, a higher adsorbent working capacity is expected as the water flow rate is increased. FIG. 7 also shows that the approach to the maximum (or minimum) temperatures is faster with increasing heat-exchange fluid flow rate. The heating curves were fit to exponential decay functions and the exponential time constants were estimated. The time constants were approximately 6 s, 9 s, and 19 s for water flow rates of 80, 40, and 20 mL/min, respectively. These data validate, from a heat transfer perspective, the potential for rapid thermal cycling in mesochannel adsorbers.

In Example 1 given above and the experiments from which FIGS. 6 and 7 were generated, the adsorption device was fabricated of all stainless steel components. Other adsorption test devices were fabricated of plastic components or a combination of plastic and metal components. The purpose of the plastic was to reduce the overall mass as well as the thermal mass. Here thermal mass implies the mass of structure which must be heated and cooled in adsorption and desorption cycles—ideally only the adsorbent would be heated and cooled, not the surrounding structure. Reductions in thermal mass result from the use of lower density and insulating materials (e.g., plastics). To enhance the rate of indirect heat transfer from a fluid contained in a heat exchange channel to an adsorbent material contained in an adjacent layer, it is preferred that the interface be fabricated of a low-mass, thermally-conducting material. This benefit can be achieved with metal-plastic composite devices and all-plastic devices with a relatively conductive heat transfer interface (e.g., a thin copper sheet or a conductive polyimide sheet).

Figure 8A:
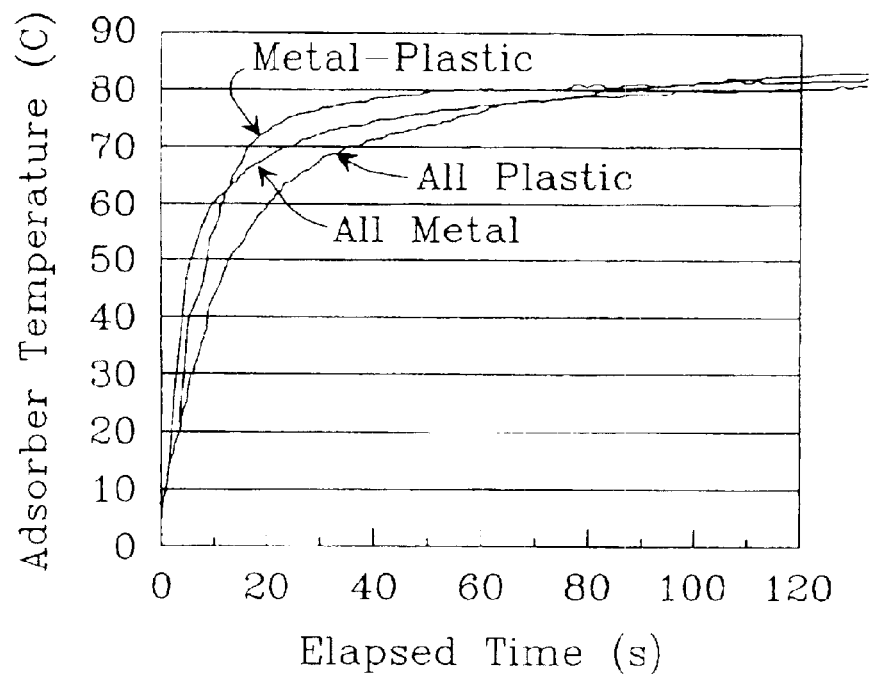
FIG. 8a is an experimentally obtained plot of adsorbent temperature vs. time for heating under comparable conditions for apparatuses that are: all-plastic, all-metal, and metal-plastic composite.
Figure 8B:
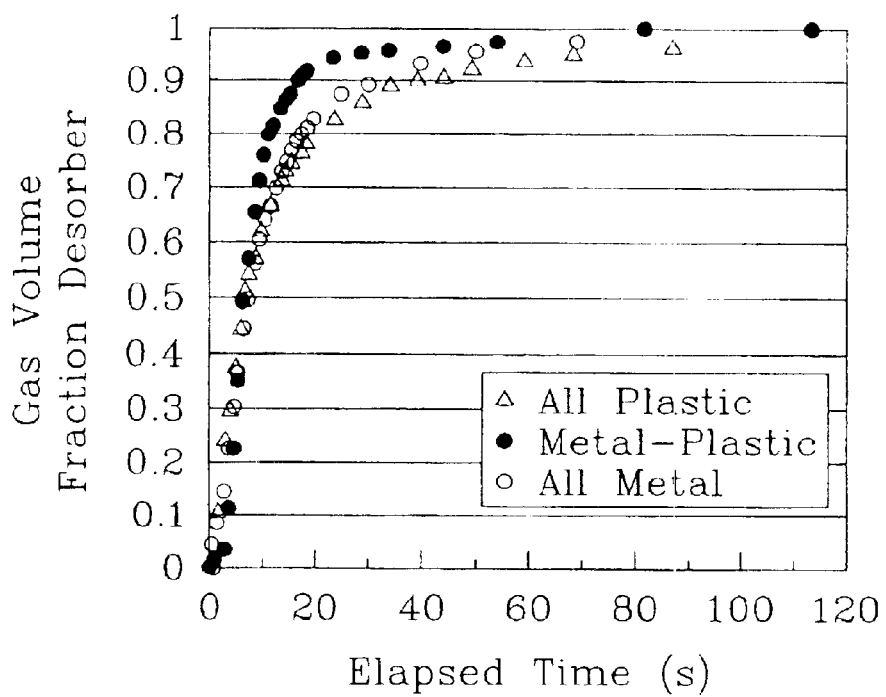
FIG. 8b is an experimentally obtained plot of gas volume fraction desorbed vs. time for heating under comparable conditions for apparatuses that are: all-plastic, all-metal, and metal-plastic composite.

Representative experimental devices, described in more detail in Example 4, were tested under isobaric conditions per Example 1. FIG. 8 compares the thermal and mass transfer performance of three different mesochannel adsorption devices during desorption cycles. In all cases, water was delivered to the adsorber heat exchangers from a 90° C. reservoir at 80 mL/min. FIG. 8a indicates a somewhat lower rate of temperature change in the all-plastic device than in the all-metal and metal-plastic composite devices. However, after ~70 s the temperatures in the all-plastic device match those in the all-metal device, and at longer times the temperatures in the all-plastic device exceed those in the all-metal device by a few degrees. This may be due to the lower thermal mass and lower heat loss associated with the plastic unit. (It should also be noted that the temperatures shown for the stainless steel device were measured on the external surface whereas the temperatures for the other devices were measured with hypodermic thermocouples embedded in the zeolite channel. It is possible that the internal temperature in the all-metal device is actually up to a few degrees higher than the external surface.) The temperature profile for the metal-plastic composite adsorber demonstrates superior qualities compared to each of the other units. It shows rapid heat transfer to the adsorber bed, the rate of temperature change exceeding the all-metal device after ~15 s. The metal-plastic composite also attained a slightly higher maximum temperature than the all-metal device, suggesting relatively low heat loss as in the all-plastic device. The profiles of gas evolution from these three devices (FIG. 8b) show similar trends. Gas desorption was fastest in the metal-plastic device and slowest in the all-plastic unit. The results suggest that heat transfer rather than mass transfer is the primary limitation in the regeneration process of these flow-through mesochannel adsorbers.

In FIG. 8b the gas volume fractions represent the absolute gas volumes normalized by the total volume desorbed. In general we observed that the absolute volume of $CO_2$ desorbed per cycle, the working capacity, was higher in all-metal adsorbers (up to 93% of theoretical) than in devices containing plastic (maximum of 62% of theoretical). We believe this is due primarily to lower device conditioning temperatures used with plastic-bearing units (~125° C.) compared to all-metal devices (~195° C.). Water vapor, which is sorbed on zeolite 13x during assembly of adsorbers exposed to atmospheric conditions, is difficult to strip from the adsorbent at low temperatures because of the strong affinity of zeolite for water. Even at 195° C. some water is adhered to zeolite. The working capacity for an all-metal device conditioned in a 195° C. oven was ~81% of theoretical. Additional conditioning of the zeolite-filled adsorber at 195° C., including treatment in a nitrogen purged vacuum oven, resulted in a working capacity increase to ~93% of theoretical. These $CO_2$ recovery results indicate that precautions that must be taken against water poisoning for low temperature operations with zeolite sorbents. Of course, the adsorption devices developed here are not specific to zeolite adsorbents (or $CO_2$ processing), and other adsorbents that are less sensitive to water may be used.

Example 4

Details of Experimental Mesochannel Adsorption Devices

Details of fabrication of three experimental mesochannel adsorption device types, stainless steel, plastic, and metal-plastic composite, are described here. Note that FIG. 1 is an oversimplified schematic of the device architecture. In practice, heat exchange channels were mounted on both sides of the adsorbent bed, not just on one side as shown in the figure. A production mesochannel adsorption cell would (at least for the case of a flow-through adsorption channel) likely consist of a series of adsorbent channels layered between heat exchange channels such that each adsorbent channel is contacted by two heat transfer surfaces. A common header and common footer would connect the adsorbent channels in the adsorption cell and a separate path would connect the heat exchange channels. The specific design of adsorbent and heat exchange channels is not restricted to those described here. The method of assembly for a production unit might also be significantly altered. For example, an all stainless steel device would likely be fabricated with diffusion bonding processes (as is typically employed to make many other microchannel and mesochannel devices) instead of using conventional welding or adhesives (e.g., RTV silicone) to join the various layers.

Stainless Steel Test Device

FIG. 2 illustrates an adsorption layer prior to final assembly. The assembled device included two heat exchange channel assemblies (not shown) sandwiching the serpentine adsorbent bed shim (also termed a sheet or laminae). During assembly the serpentine channel was filled with zeolite or other adsorbent material. The components of this experimental test device were temporarily bonded using RTV silicone to facilitate disassembly and reuse with different adsorbent. The heat exchange assemblies consisted of blank stainless steel header shims to which gas and heat exchange fluid inlet and outlet tubes were welded. The heat exchange channel was formed adjacent to the header plate with a microchannel heat exchange shim originally designed for another microchannel device.

Sample assembly of an all-stainless steel adsorber: (a) 0.020-in (0.51 mm) thick stainless steel header plate for fluid fed to and retrieved from the adsorbent channel including a porous metal screen cover over the ports to prevent loss of adsorbent from channel (c); (b) ~0.010-in. (0.25 mm) height heat exchange fluid channel etched in 0.020-in. thick stainless steel shim stock with the etched surface facing the header plate (a); (c) a stainless steel serpentine adsorbent shim, typically 0.060-in. (1.5 mm) thick; (d) another heat exchange fluid channel (b) with the etched surface facing the header plate (e); and (e) 0.020-in thick stainless steel header plate for fluid fed to and retrieved from the heat exchange fluid channels. The sepertine adsorbent mesochannel could be made by a technique such as milling and the microchannels in the microchannel heat exchanger can be made by a technique such as electrodischarge machining. Alternatively, either can be made by photochemical machining or other suitable machining techniques.

All-Plastic Test Device

Like the stainless steel device, the all-plastic mesochannel adsorber included two heat exchange microchannel assemblies surrounding a serpentine mesochannel adsorbent bed shim. In the plastic unit however, both the adsorbent shim and heat exchange channels were fabricated of polyimide, and the header plates were made from a transparent plastic such as polycarbonate. Heat exchanger shims in the all-plastic and the plastic/metal composite devices were patterned using a Resonetics Maestro UV excimer laser machining station operated at a wavelength of 248 nm. The serpentine design of the heat exchange channel tracked the adsorbent channel to maximize effective heat transfer to the adsorbent. The various device layers were assembled with thin sheets of double-sided adhesive film cut in the appropriate pattern. The units were pressed in a lab press to promote bonding.

An all-plastic adsorber was assembled with the shim order: (a) 0.25-in thick polycarbonate header plate for fluid fed to and retrieved from the adsorbent channel; (b) adhesive film; (c) ~0.011-in. thick serpentine heat exchange fluid channel laser cut in polyimide film; (d) adhesive film; (e) a thin (e.g., 0.030-in. thick) heat exchange surface film fabricated from polyimide or conductive polyimide; a pattern of small holes was laser machined in the corners of the shim serving the purpose of the metal screens described above [layer (a) of the all-stainless steel device]; (f) adhesive film; (g) a polyimide serpentine adsorbent shim, typically 0.050-in. (1.3 mm) thick, machined in the same pattern used in the all-metal device (see FIG. 2) and filled with zeolite; (h) adhesive film; (i) a heat exchange surface (e) except without the laser machined adsorbent screen; (j) adhesive film; (k) serpentine heat exchange channel (e); (l) adhesive film; and (m) 0.25-in thick polycarbonate header plate for fluid fed to and retrieved from the heat exchange fluid channels.

Metal-Plastic Test Device

Metal-plastic composite devices were also fabricated and tested. A unit was prepared as described for the all-plastic device except the heat exchange surface films (e) and (i) were replaced with thin copper shims. Results for this type of composite device are shown in FIG. 8.

Another variation of a metal-plastic mesochannel adsorber has been fabricated and used in a limited number of experiments. It is identical to the all-stainless steel device described above excepting the central adsorbent shim (c) is replaced with a polyimide equivalent like that used in the other metal-plastic and all-plastic adsorbers (e.g., 0.050-in., 1.3 mm thick).

In the all-plastic and the metal-plastic adsorbers, the design of the heat exchangers was the same. In the all-metal adsorber, the design of the heat exchangers was somewhat different, but the fluid channel thickness (0.010 in, 0.25 mm) was comparable. The adsorption channel in each device was packed with zeolite 13x adsorbent (PQ Corp., 180 to 212 µm sieve fraction). A test stand stand was assembled to control feed gas (pure $CO_2$) and heat exchange fluid (water) flow rates and to allow monitoring adsorber and heat exchange fluid temperatures, pressure drops, and evolved gas volumes. Type K surface mount and immersion probe thermocouples were deployed in all tests; in several tests, a type T hypodermic thermocouple (Omega™) was embedded in the adsorption media to measure the adsorption media temperature directly. Temperatures were output and recorded to an Omega data acquisition system on a personal computer. The series of valves needed to switch between adsorption and desorption cycles (FIG. 1) were controlled manually. During desorption, gas was evolved at essentially ambient pressure through a tube to the head space of an inverted graduated cylinder that was partially filled with water and whose opening was submerged in a room temperature water reservoir. The water displaced from the cylinder measured the volume of evolved gas. To monitor gas evolution as a function of time, the water displacement from the cylinder was video taped for subsequent evaluation. Ideal gas law assumptions were applied to determine the equivalent mass of $CO_2$ released for comparison to the theoretical working capacity.

Example 5

Calculated Productivity

The use of a mesochannel sorption pump, as described herein, provides a means of process intensification for gas processing by thermal swing adsorption. The productivity, defined as the mass of target gas processed per unit volume sorption pump, is a measure of process intensification. The productivity is related to many factors including cycle rate, gas stream composition, adsorption and desorption temperatures and pressures, and adsorbent type and condition.

Figure 10:
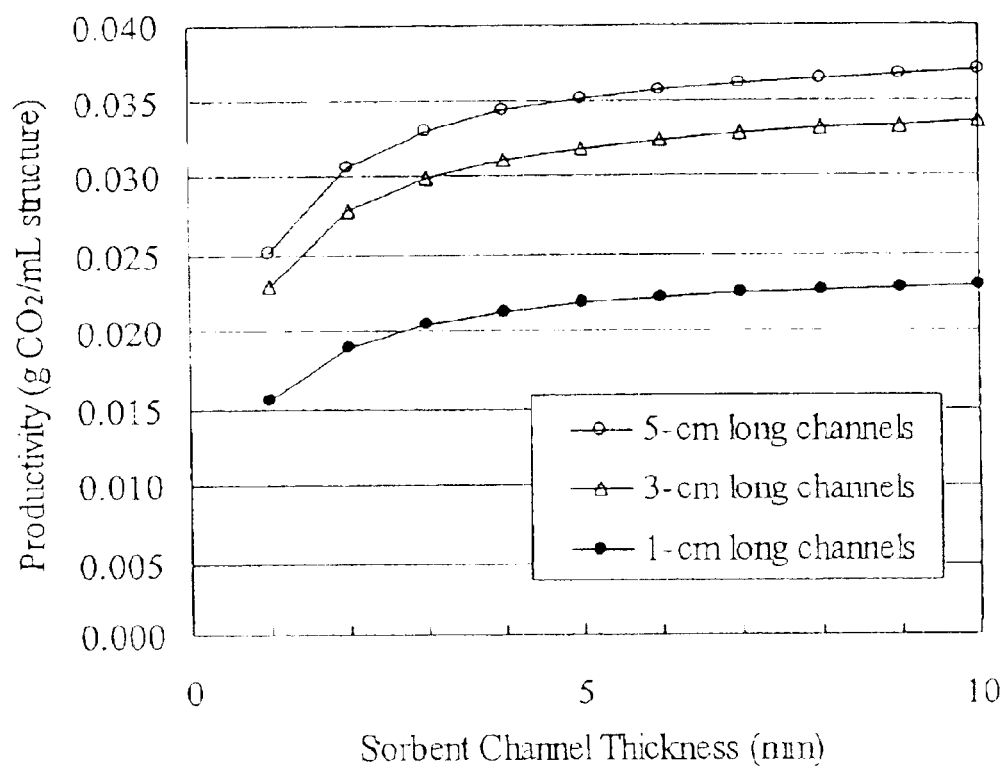
FIG. 10 is a graph of predicted productivity of sorption pumps according to the present invention when tested under specified benchmark conditions.

The Productivity Graph (see FIG. 10 ) shows the productivity of several sorption devices of the current invention using a set of benchmark conditions. These include: (a) adsorbent channels filled with clean, dry zeolite 13x particulate to a density of ~0.67-g zeolite/mL channel; (b) $CO_2$ adsorbed to equilibrium at 760 mm Hg and 5° C. by flowing a 5° C. heat transfer fluid through the heat exchange channels and pure $CO_2$ through the adsorbent per FIG. 1a; and (c) desorption of $CO_2$ at a pressure of 760 mm Hg resulting from the flow of 90° C. heat transfer fluid through the heat exchange channels (limiting the desorption temperature) per FIG. 1b. A further constraint on this test, is that the productivity is defined for a single desorption of the device occurring in 1 minute (or less) from the time the high temperature heat exchange fluid starts flowing through the sorption unit or heating is initiated. Therefore, the productivity results in the Productivity Graph represent the mass of $CO_2$ desorbed in a single desorption per unit volume of sorption pump structure subject to the constraints given above. The theoretical maximum mass of $CO_2$ desorbed under these conditions can be estimated using Equation (2) and the volume and density (or mass) of adsorbent contained in the device. As noted previously, the actual working $CO_2$ production of such operations may be less than 100% owing to various factors such as partial loading of the adsorbent with water vapor. Maximum productivity would also not be attained if the sorbent did not reach the temperature of the heat exchange fluid. Accounting for this type of inefficiency, we have applied an efficiency factor of 0.85 in our calculations, a factor we expect to meet or exceed in routine operations. The results in the Productivity Graph are 85% of the maximum theoretical productivity.

The Productivity Graph demonstrates that productivity is a strong function of sorption pump design. This is a direct result of the variation in the amount of adsorbent contained per unit volume of sorption pump structure. The structure volume is defined by the outer walls (e.g., plates) of the sorption unit, and it contains the adsorbent mesochannels, the heat exchange channels, and internal header and footer channels needed to deliver and collect fluids from the heat exchange and adsorption channels. In the cases presented in the Productivity Graph, the sorption pump consisted of 10 adsorbent mesochannels interspersed with 11 heat exchange channels such that each adsorbent channel was contacted by two heat exchange surfaces. The height of the heat exchange channels, the outer wall thickness, the header and footer channel cross section, and the width of the adsorbent channels (5 cm) were fixed, while the channel lengths and adsorbent mesochannel height (thickness) were varied. The Productivity Graph shows calculated results for 1-, 3-, and 5-cm long channels. At any given channel length, the expected maximum productivity increases as the adsorbent mesochannel thickness (height) increases, because the fraction of the device structure occupied by sorbent increases accordingly. In the limit of infinite adsorbent channel height, the sorption pump structure volume is dominated by adsorbent, and an asymptotic limit on productivity is reached. In practice, however, the adsorbent channel thickness must be limited to affect rapid heat transfer and rapid cycling for increased production rates (see Examples 1 and 2). The Productivity Graph also shows that at a given adsorbent mesochannel thickness, the productivity increases with increasing channel length. Again, this is due to the increase in the fraction of structure volume occupied by sorbent with increasing length. In practice, channel length may be limited because of pressure drop considerations.

Under the benchmark test conditions specified above, it can be seen that various configurations of our invention will meet or exceed a productivity of 0.015-g $CO_2$ per mL-sorption pump structure volume.

Table 1 summarizes estimates of $CO_2$ productivity that we calculated for sorption compressors described in Karperos, "Operating Characteristics of a Hydrogen Sorption Refrigerator—Part I. Experimental Design and Results," Proceedings of the Fourth International Cryogenic Conference, Easton, Md. (1986). The calculations are predicated on the assumptions of sorbent type, adsorption and desorption temperature and pressure operating limits, and desorption cycle time used to determine productivity for the current invention and as described in conjunction with the Productivity Graph. For the estimates of the devices in Karperos, however, the operation was assumed 100% efficient, thereby resulting in an estimate of maximum potential productivity. Karperos describes the use of a 20% density copper foam within the sorbent channel to promote heat transfer; in the calculations made here, it was assumed that 20% of the sorbent channel was occupied by the foam, effectively decreasing the sorbent volume within the compressor.

TABLE 1

Basis of Productivity Calculations for Sorption Compressor Described in Karperos, "Operating Characteristics Of A Hydrogen Sorption Refrigerator," Proceedings of the Fourth Int'l Cryogenic Conference (1986)

|  | Device 1, FIG. 4 Left (as est. from text, Sec 3 and drawing FIG. 4) | Device 1, FIG. 4 Right (as est. from text, Sec 3 and drawing FIG. 4) |
|---|---|---|
| Compressor Radius (cm) | 2.822 | 2.782 |
| Compressor Height (cm) | 51.1 | 26.64 |
| Compressor Volume (mL) | 1278.5 | 647.7 |
| Sorbent Annulus, Rout (cm) | 2.382 | 2.382 |
| Sorbent Annulus, Rin (cm) | 2.064 | 2.064 |
| Sorbent Annulus Ht (cm) | 50.8 | 25.4 |
| Sorbent Volume in Annulus (mL) | 180.5 | 90.2 |
| Sorbent Upper Disk Thickness (cm) | 0 | 0.22 |
| Sorbent Volume in Upper Disk (mL) | 0 | 3.92 |
| Sorbent Volume Total (mL) | 180.5 | 94.2 |
| Zeolite 13x Mass (g) | 120.9 | 63.1 |
| Maximum Mass $CO_2$ desorbed per cycle (g) | 11.6 | 6.03 |
| Maximum Productivity (g $CO_2$/mL compressor) | 0.00905 | 0.00932 |

Example 6

Heat Transfer Power Density

The productivity of a mesochannel sorption pump is in part dependent upon the heat transfer power density that can be obtained in the thermal interaction between adsorbent channels and heat exchange channels. A calculation was performed to estimate the heat transfer power density required for a collection of mesochannel sorption pump cells, for the thermochemical compression of $CO_2$ from 760 mm Hg to a higher pressures, ranging from 0.5 bat to 10 bar. As previously described, the heat transfer power density is the rate at which heat is added to or removed from an adsorption cell, in units of watts per cubic centimeter. For the calculation, a "flow-by" design was assumed, incorporating adsorbent mesochannels containing 13x zeolite with height, width and length, respectively, of 750 $\mu$m, 1 cm, and 5 cm, and microchannel heat exchangers with height, width and length, respectively, of 250 $\mu$m, 1 cm, and 5 cm. A stainless steel structure was assumed, as was the recuperative heat transfer cycle of Swyulka, where thermal energy from cells that are cooling are transferred to cells that are heating. The "delta T" (which represents the difference in temperature between the temperature of desorption and the temperature of adsorption) of each cycle was varied, with individual calculations assuming a delta T of 100° C. or 200° C. Two and four minute cycles were also assumed for this set of bounding calculations.

The calculations considered the full heating and cooling requirements for each cell, including consideration of the thermal mass of the units plus the heats of adsorption and desorption. In general, the heat transfer power densities that were calculated from this exercise ranged from 1.10 watts per cubic centimeter to 5.99 watts per cubic centimeter, with the highest heat transfer power densities corresponding to the shortest cycle periods, and greatests delta T's per cycle.

The heat transfer power densities that were calculated in this exercise are of magnitudes that can be obtained in systems that incorporate mesochannel heat exchangers; indeed, it is not difficult to obtain heat transfer power densities that are approximately one order of magnitude higher, yet with low pressure drops for the heat transfer fluids, suggesting that shorter cycle times would also be achievable for mesochannel sorption pumps.

It is also clear from this calculation that, if longer cycle times had been assumed, for example, at about 10 minutes per cycle, the heat transfer power densities would be somewhat less. Mesochannel sorption pumps therefore are estimated to be able to obtain specific productivities (output per unit hardware volume) that require heat transfer power densities exceeding 1 watt per cubic centimeter, and perhaps exceeding tens of watts per cubic centimeter.

Example 7

Calculations of Mass Transport Times in Flow-By Mesochannel Adsorbers

Previously, we defined the characteristic mass transport time ($t_{mt}$) in an adsorbent channel as $$t_{mt} = \frac{L^2}{D_e} \quad (7)$$

It is related to the time required for a substantial degree of mass diffusion to occur at a distance L within the adsorbent. $D_e$ is the effective mass diffusivity for diffusion in a porous medium given by $$D_e = D\frac{\varepsilon}{\tau}, \quad (8)$$

where D is the mass diffusivity of the species in the fluid, and $\varepsilon$ and $\tau$ are the porosity and tortuosity factor, respectively, of the porous medium.

Another method to assess transient mass transport and the approach to the equilibrium concentration of gas species within an adsorbent channel is to apply the solution for the problem of unsteady state mass transport in a semi-infinite medium. The problem and solution are routinely described in the mass and heat transport literature (e.g., Hines, A. L. and R. N. Maddox, Mass Transfer, Fundamentals and Applications, Prentice-Hall, Inc., Englewood Cliffs, N.J., 1985.). Physically and as applied here, the semi-infinite approximation assumes diffusion from a surface or reservoir, like the fluid channel in a contactor-based "flow-by" adsorber, at constant concentration $C_{Ao}$ of species A to a medium of vast extent (semi-infinite) initially at some lower concentration $C_{A\infty}$. In this case, we treat the adsorbent channel in the "flow-by" system as semi-infinite and assign a value of zero to $C_{A\infty}$. The variation in species A concentration $C_A$ as a function of the semi-infinite diffusion time $t_{si}$ and the distance L within the adsorbent channel can then be estimated from the Gauss error function (erf) solution to the semi-infinite diffusion problem:

$$1 - \frac{C_A}{C_{Ao}} = \text{erf}\left(\frac{L}{2\sqrt{D_e t}}\right) = \text{erf}(\eta_{si}) \quad (9)$$

The results of $\text{erf}(\eta_{si})$ for $\eta_{si}$ values ranging from 0 to 3 are tabulated in many mathematical handbooks and in some mass and heat transport texts.

Strictly speaking, the solutions given by Equation (9) apply when the concentration of species at some point in the medium where diffusion is taking place remains at the initial concentration ($C_\infty$). This occurs when the time is very short and little diffusion has occurred or at relatively large distances from the diffusion source. It is instructive to investigate solutions of Equation (9) to diffusion in mesochannel adsorbers, even though the physical situation may not adhere strictly to the aforementioned conditions, to better understand the relationship of species concentration with time. In fact, the solutions given by Equation (9) do not take into consideration other factors in an adsorption process, such as depletion of gas species as they are adsorbed onto the adsorbent, or some of the boundary constraints (e.g., walls) that will be present in a practical, mesochannel sorption unit.

Figure 9:
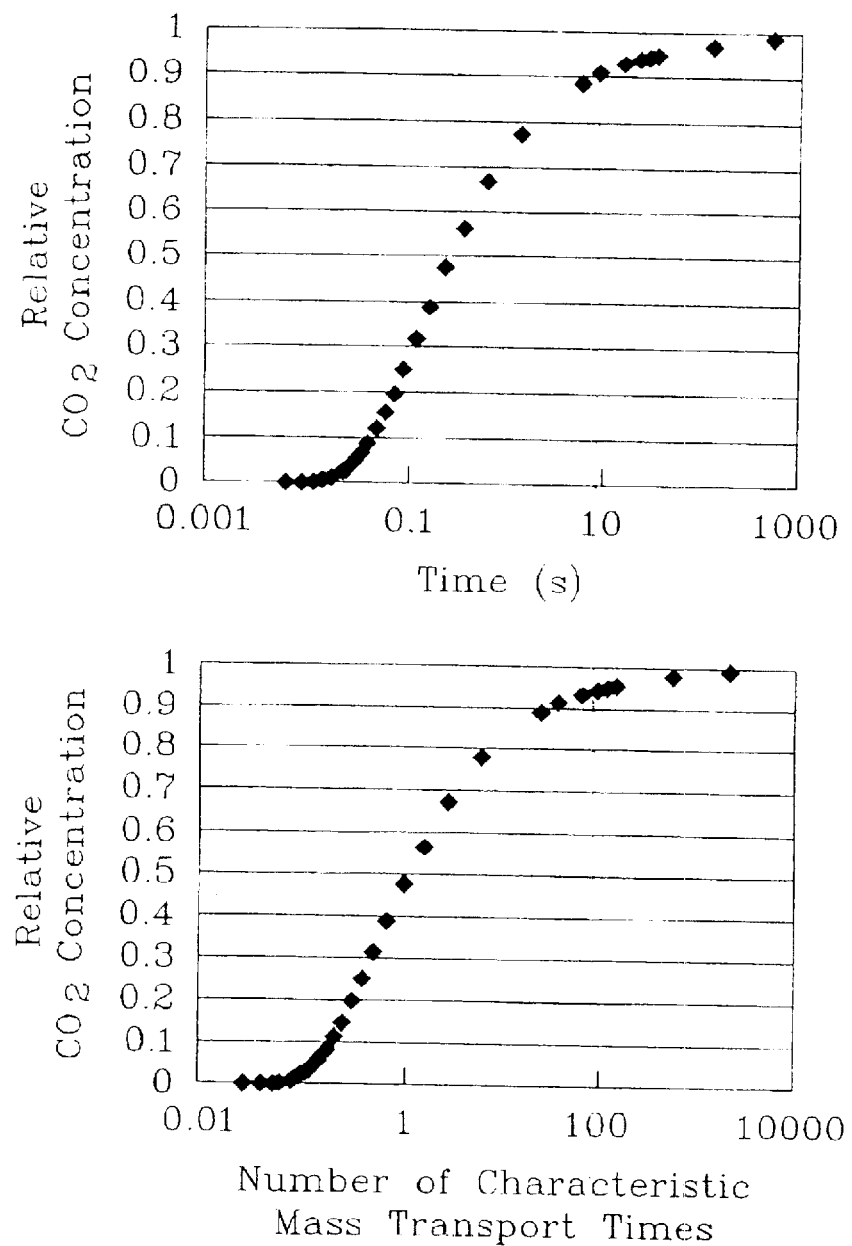
FIG. 9 shows mass diffusion graphs. Predicted variation in relative $CO_2$ concentration as a function of time (upper) and number of characteristic mass transport times (lower) for semi-infinite diffusion at a distance L of 0.8 mm in a porous adsorbent ($\epsilon=0.5$, $\tau=3$, and $D=1.67\times10^{-5}$ $m^2/s$).

Acknowledging the oversimplification of the analysis, we present solutions to the semi-infinite diffusion problem for the case of a-contactor-based, "flow-by" adsorbent microchannel for diffusion of $CO_2$ in $N_2$ at 298 K and 1 atm (D=1.67×10−5 m²/s),where L=800 $\mu$m, into and within an adsorbent media with a porosity of 0.5 and a tortuosity factor of 3. The time variation in relative $CO_2$ concentration ($C_A/C_{Ao}$) for these conditions is shown in the Mass Diffusion Graphs (FIG. 9). In the upper Mass Diffusion Graph, time is presented in seconds; in the lower graph, the same results are represented in terms of the characteristic mass transport time ($t_{mt}$) for a microchannel of height (h) equal to L.

The Mass Diffusion Graphs confirm that a substantial amount of diffusion has occurred at t=$t_{mt}$. More specifically, when the semi-infinite diffusion time is equal to the characteristic mass transport time (t=$t_{mt}$) for a microchannel of 800 $\mu$m height, the relative $CO_2$ concentration at 800 $\mu$m is 0.48, or 48% of the steady state value. This corresponds to a $\eta_{si}$ value of 0.5 in Equation (9) and a diffusion time of 0.23 s.

In general, the Mass Diffusion Graphs indicate that the $CO_2$ concentration at the specified distance increases rapidly with time for short times up to moderate $CO_2$ concentrations (e.g., $C_A/C_{Ao}$<0.8), but the rate of change drops off significantly when the relative $CO_2$ concentration is high. For example, 29.2 s are needed to reach a relative $CO_2$ concentration of 0.95, corresponding to 127-times the characteristic mass transport time ($t_{mt}$). Note that the bulk average concentration in the adsorbent channel between the source and a distance L into the adsorbent channel would be higher than relative concentration determined at L, because the relative concentration at a given time for any distance less than L exceeds the concentration at L. In other words, a concentration gradient exists. Again, the analysis does not evaluate gas species depletion due to uptake by an adsorbent, and does not take into account some of the boundary conditions that would be present in a mesochannel, but it is useful in characterizing and comparing transient mass transport response for various mesochannel adsorber configurations.

As previously described, Viswanathan et al. applied the solution for unsteady state mass transport in a semi-infinite diffusion medium to their contactor-based "flow-by" adsorber, and reported an estimate of 30 seconds for 95% of the $CO_2$ to reach the zeolite adsorbent (Viswanathan, Wegeng, and Drost, "Microscale Adsorption for Energy and Chemical Systems", appearing on the Pacific Northwest National Laboratory web site in May 2000). This calculation confirms the potential for rapid mass diffusion within an adsorption microchannel, therefore indicating that rapid cycling might be achieved.

Although the devices described in the Examples section were all single channel devices; the designs are suitable for multichannel units having at least comparable working capacity performance on a per hardware volume basis.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A sorption pump comprising:
   at least 2 adsorption layers;
   wherein each of the at least 2 adsorption layers comprises an adsorption mesochannel containing adsorption media; and
   at least 3 heat exchanger layers
   wherein each of the at least 3 heat exchange layers is in thermal contact with an adsorption layer;
   wherein each of the at least 3 heat exchange layers comprises at least one microchannel;
   wherein the adsorption layers are interleaved with the heat exchange layers; and
   wherein each of the at least 2 adsorption layers has a gas inlet such that gas directly contacts the adsorption media without first passing through a contactor.

2. The sorption pump of claim 1 wherein each of the at least 2 adsorption layers comprises a plastic and wherein each of the at least 3 heat exchange layers comprises a metal.

3. The sorption pump of claim 1 further comprising, in each of the at least 2 adsorption layers, a gas outlet separate from the inlet;
   wherein the outlet is disposed such that a gas stream can flow through the inlet, through the adsorption media and out the outlet.

4. The sorption pump of claim 3 wherein the pump possesses capability such that, if the adsorption media is replaced with an equal volume of 13× zeolite, with a bulk density of 0.67 grams per cubic centimeter, and then saturated with carbon dioxide at 760 mm Hg and 5° C. and then heated to no more than 90° C. at 760 mm Hg, then at least 0.015 g $CO_2$ per mL of apparatus is desorbed within 1 minute of the onset of heating.

5. Gas adsorption and desorption apparatus comprising:
   at least one adsorption layer comprising an adsorption mesochannel containing adsorption media; and
   at least one heat exchanger in thermal contact with the adsorption layer;
   wherein the adsorption mesochannel has dimensions of length, width and height;
   wherein the height is at least 1.2 mm; and
   wherein the apparatus possesses capability such that, if the adsorption media is replaced with an equal volume of 13× zeolite, with a bulk density of 0.67 grams per cubic centimeter, and then saturated with carbon dioxide at 760 mm Hg and 5° C. and then heated to no more than 90 ° C., at 760 mm Hg, then at least 0.015 g $CO_2$ per mL of apparatus is desorbed within 1 minute of the onset of heating.

6. The apparatus of claim 5 comprising:
at least 2 adsorption mesochannels, each containing adsorption media, interleaved with at least 3 heat exchanger layers, each heat exchanger layer comprising at least one microchannel.

7. Gas adsorption and desorption apparatus comprising:
at least 4 adsorption/desorption cells
each cell comprising at least one adsorption mesochannel in thermal contact with at least one heat exchanger;
wherein the at least one heat exchanger comprises a microchannel heat exchanger;
wherein the adsorption channel contains adsorption media;
the apparatus connected to a heat source and a heat sink; and
conduits between each heat exchanger and the heat source and the heat sink and also conduits between at least one heat exchanger in each cell and at least one heat exchanger in another cell.

8. A sorption pump, comprising:
an adsorption layer comprising an adsorption channel containing adsorption media; and
a mesochannel heat exchanger in thermal contact with the adsorption layer;
wherein the mesochannel heat exchanger has a fluid flowing therethrough that has a high thermal diffusivity, such that the characteristic heat transport time of the fluid in combination with the mesochannel heat exchanger is a value no greater than 10 seconds; and
wherein said fluid is a liquid metal or a silicone-based fluid.

9. A multi-cell sorption pump, comprising:
at least six sorption cells; wherein each sorption cell comprises at least one adsorption layer, and at least one heat exchanger layer;
thermal connections connecting each sorption cell to at least two other sorption cells and to a heat source and to a heat sink, such that each sorption cell can cycle thermally from adsorption to desorption and back to adsorption by sequentially receiving heat from said at least two other sorption cells prior to receiving heat from the heat source, and then sequentially giving up heat to at least two other sorption cells prior to giving up heat to the heat sink, such that thermal recuperation is provided.

10. The multi-cell sorption pump of claim 9, wherein the heat source is selected from the group consisting of an electrical resistor, a process technology, solar power, nuclear power.

11. The multi-cell sorption pump of claim 9, where the thermal connections are heat switches.

12. The multi-cell sorption pump of claim 9, wherein the thermal connections comprise fluid loops.

13. The multi-cell sorption pump of claim 9, wherein the sorption pump incorporates mesochannel sorption channels, and wherein the sorption pump incorporates mesochannel heat exchange channels.

14. The sorption pump of claim 4 where the adsorption media is heated to 90° C. by flowing warm water at 90° C. through the heat exchange channels.

15. An air treatment system comprising the sorption pump of claim 1, comprising:
an oxygen source;
a first sorption cell comprising the sorption pump of claim 1 wherein the adsorption media comprises a water adsorbent;
a second sorption cell comprising the sorption pump of claim 1 wherein the adsorption media comprises a water adsorbent;
a third sorption cell comprising the sorption pump of claim 1 wherein the adsorption media comprises a $CO_2$ adsorbent; and
a fourth sorption cell comprising the sorption pump of claim 1 wherein the adsorption media comprises a $CO_2$ adsorbent.

16. A sorption pump, comprising:
an adsorption layer comprising an adsorption channel containing adsorption media; and
a mesochannel heat exchanger in thermal contact with the adsorption layer;
wherein the mesochannel heat exchanger has a fluid flowing therethrough that has a high thermal diffusivity, such that the characteristic heat transport time of the fluid in combination with the mesochannel heat exchanger is a value no greater than 10 seconds;
wherein adsorption media fills at least 60% of the cross section of at least one portion of the adsorption channel.

17. The sorption pump of claim 16 wherein the adsorption channel has a height of 1.2 mm to 1 cm.

18. The sorption pump of claim 16 wherein the adsorption channel has a height of 1 cm or less, and wherein adsorption media fills at least 90% of the cross section of at least one portion of the adsorption channel.

19. The sorption pump of claim 1 wherein the adsorption mesochannels in each of the at least two adsorption layers are at least 50% filled with adsorption media.

20. The sorption pump of claim 1 wherein the each of the at least two adsorption layers comprise a plastic structural material, and wherein each of the at least 3 heat exchanger layers comprise a metal structural material.

21. The sorption pump of claim 1 wherein the each of the at least two adsorption layers comprise adsorption media and interspersed thermally conductive materials.

22. The sorption pump of claim 1 wherein the each of the at least two adsorption layers comprise an adsorption mesochannel that is cut completely through the adsorption layer.

23. The sorption pump of claim 1 wherein the each of the at least two adsorption layers comprise an adsorption mesochannel comprising an adsorption media in the form of particles, pellets, foams, felts, or honeycombs.

24. The sorption pump of claim 6 wherein the each of the at least two adsorption layers comprise a plastic structural material, and wherein each of the at least 3 heat exchanger layers comprise a metal structural material.

25. The sorption pump of claim 5 wherein the adsorption media is in the form of particles, pellets, foams, felts, or honeycombs.

26. The sorption pump of claim 5 wherein the adsorption mesochannel is at least 50% filled with adsorption media.

27. The sorption pump of claim 5 wherein adsorption media fills at least 60% of the cross section of at least one portion of the adsorption channel.

* * * * *